United States Patent
Miyamoto et al.

(10) Patent No.: US 6,954,941 B2
(45) Date of Patent: Oct. 11, 2005

(54) INFORMATION RECORDING MEDIUM AND INFORMATION RECORDING DEVICE

(75) Inventors: Makoto Miyamoto, Ome (JP); Junko Ushiyama, Kokubunji (JP); Keikichi Ando, Musashino (JP); Yumiko Anzai, Ome (JP); Akemi Hirotsune, Urawa (JP); Motoyasu Terao, Hinode (JP); Tetsuya Nishida, Tokyo (JP); Yasushi Miyauchi, Akishima (JP); Mitsuhide Miyamoto, Kokubunji (JP)

(73) Assignees: Hitachi, Ltd., Tokyo (JP); Hitachi Maxell, Ltd., Osaka (JP)

( * ) Notice: Subject to any disclaimer, the term of this patent is extended or adjusted under 35 U.S.C. 154(b) by 2 days.

(21) Appl. No.: 10/653,161

(22) Filed: Sep. 3, 2003

(65) Prior Publication Data

US 2004/0042381 A1  Mar. 4, 2004

Related U.S. Application Data

(63) Continuation of application No. 09/807,116, filed as application No. PCT/JP99/05444 on Oct. 4, 1999, now Pat. No. 6,636,477.

(30) Foreign Application Priority Data

Oct. 7, 1998 (JP) ............................................ 10-285008

(51) Int. Cl.$^7$ .............................. G11B 7/24; G11B 5/84
(52) U.S. Cl. ....................................... 720/718; 369/286
(58) Field of Search .......................... 720/718; 369/286, 369/283, 288, 13.38

(56) References Cited

U.S. PATENT DOCUMENTS

| | | | |
|---|---|---|---|
| 4,635,076 A | 1/1987 | Wilson et al. | |
| 5,191,565 A | * 3/1993 | Inoue et al. | ................. 369/284 |
| 5,470,628 A | 11/1995 | Tominaga et al. | |
| 5,635,267 A | 6/1997 | Yamada et al. | |
| 5,656,370 A | 8/1997 | Murakami et al. | |
| 5,723,032 A | * 3/1998 | Yamaguchi et al. | ...... 204/192.2 |
| 6,049,521 A | 4/2000 | Aratani | |
| 6,221,455 B1 | 4/2001 | Yasuda et al. | |
| 6,245,404 B1 | 6/2001 | Saito et al. | |
| 6,296,915 B1 | * 10/2001 | Yusu et al. | ................ 428/64.1 |
| 6,349,076 B1 | 2/2002 | Chen | |
| 6,528,138 B2 | * 3/2003 | Meinders et al. | .......... 428/64.1 |

FOREIGN PATENT DOCUMENTS

| | | |
|---|---|---|
| JP | 03-272032 | 12/1991 |
| JP | 08-031014 | 2/1996 |

* cited by examiner

Primary Examiner—Allen Cao
(74) Attorney, Agent, or Firm—Antonelli, Terry, Stout & Kraus, LLP

(57) ABSTRACT

This invention relates to an information-recording medium that is used for recording information through radiation of energy beam. The information recording medium has a groove-shaped information recording track and is provided with a recording layer, one or more kinds of heat sink control layers and heat sink layers. A sum of film thickness of the more than one kind of recording layer is equal to or less than a step between information recording tracks, and a sum of film thickness of one or more kinds of heat sink control layers is more than a groove depth of the information recording track. With this configuration, no cross-erase is produced even if the information-recording medium is applied for a high density recording with the track pitch being 70% or less.

5 Claims, 14 Drawing Sheets

INFORMATION RECORDING MEDIUM AND INFORMATION RECORDING DEVICE

CROSS-REFERENCE TO RELATED APPLICATIONS

This application is a continuation of U.S. Ser. No. 09/807,116 filed 9 Apr. 2001, now U.S. Pat. No. 6,636,477 B1, which is a 371 of PCT/JP99/05444, filed Oct. 4, 1999.

TECHNICAL FIELD OF THE INVENTION

The present invention relates to an information-recording medium in which information is recorded through radiation of an energy beam, and the information-recording medium, and more particularly a phase change optical disk or a rewritable optical disk such as an optical-magnetic disk. Further, the present invention relates to an information recording apparatus in which either reproduction or recording for the information recording medium is carried out in a superior manner.

In the description of the present invention, the information-recording medium is sometimes expressed as a phase change-optical disk, an optical magnetic disk, or merely an optical disk. In addition, if the information-recording medium is a medium in which radiation of energy beam may generate heat and this heat may generate a certain variation in atomic arrangement or magnetic momentum to perform information recording operation, the present invention can be applied to this medium, so that the present invention may also provide a certain effect against information recording medium other than a disk-like information recording medium such as an optical card and the like.

In addition, although the energy beam is sometimes expressed as a laser beam or merely as a laser light, if the energy beam can generate heat on the information recording medium as described above, the present invention can be applied to the information recording medium in which information is generally recorded with energy beam such as an electron beam, an ion beam or the like that are not normally meant by light.

BACKGROUND OF THE INVENTION

In the case of rewritable optical disk, there was provided in general a method in which some groove or land (groove shape) type steps are set on a plastic substrate as a laser beam tracking and information is recorded at the groove or land. However, in order to improve a density in recording (a narrow trackpitch), a method for recording information at each of groove and land under utilization of the groove and land shapes has been developed in recent years. In this case, the protruded shape in the groove and land is called as a land and the notch shape of the groove and land is defined as a groove. In general, in the case that a track pitch in the information recording medium is changed into a narrow track pitch down to about 80% of a laser beam spot and information is recorded at both land and groove, a leakage of reproducing signal is produced from the adjacent track (either the groove against the land or the land against the groove). For example, when information recorded at the land is reproduced, the reproducing signal from information recorded at the groove is leaked to generate a problem that information recorded at the land cannot be accurately reproduced. The leakage of the reproduced signal from information recorded in the adjacent track is called as a cross-talk.

In order to solve this problem, it is well known in the art to provide a method in which a plurality of magnetic layers are arranged to act as a recording layer and information only at the high temperature section is reproduced under utilization of temperature distribution at the recording layer when the laser beam is radiated (the prior art 1: Japanese Patent Laid-Open No.Hei 8-249737, the prior art 2: Japanese Patent Laid-Open No.Hei 9-293286). In accordance with these methods, since a temperature at the recording layer in the adjacent track becomes a low temperature as compared with the temperature at the recording layer of the center track, no leakage of the reproducing signal from information recorded in the adjacent track is generated. However, such a recording system as above does not provide any sufficient measure against a method for restricting a phenomenon (a so-called cross-erase) in which information (a recording mark) recorded in the adjacent track (the adjacent groove at the time of recording at the land or the adjacent land at the time of recording at the groove) is erased. For example, although the prior art 1 has a heat sink layer with a high thermal conductivity at a side opposite to the laser beam incident side, a distance between the magnetic layer and the heat sink layer is short with 20 nm or less, so that heat is easily dispersed at the adjacent track through the heat sink layer. In addition, although the distance between the magnetic layer and the heat sink layer in the prior art 2 is relatively thick of 80 nm, there are provided three metal magnetic layers as the recoding layer (a functional thin film changing in atomic arrangement or changing in electronic state under application of radiation of the laser beam and a total film thickness of the three layers has a quite thick thickness of 145 nm. Due to this fact, it has been found that heat is dispersed within the recording layer to delete information recorded in the adjacent track.

Accordingly, it has become a substantial problem that a technology for reducing a cross-erase is developed.

However, a step (a groove depth) between a center of the groove and a center of the land in the groove and land shape is usually set to $\lambda/8$, where $\lambda$ is a wavelength of laser forming a laser beam. A reason why this value is set consists in the fact that the largest tracking error signal can be attained when the groove depth is $\lambda/8$. However, there sometimes occurs a case that the groove depth is $\lambda/7$ or more and $\lambda/5$ or less due to the fact that a land groove recording system has been developed recently (prior art 3: Japanese Patent Laid-Open No. Hei 6-338064). A feature of this system consists in the fact that a cross-talk from an adjacent track (a leakage of signal from an adjacent track) can be cancelled even if a track pitch is made to be narrow by about 60% of that of the laser beam spot. However, this recording system does not provide a sufficient measure about a method for restricting a phenomenon (a so-called cross-erase) for deleting a recording mark recorded in the adjacent track (the adjacent groove at the time of land recording or the adjacent land at the time of groove recording). For example, in the prior art 3, although GeSbTe phase change recording material with a low thermal conductivity as compared with metal is used as a recording layer and further the film thickness of the recording layer is 5 to 50 nm, so that it has been found to generate a problem that a distance between the recording layer and the heat sink layer (a reflective layer) has a low value of 18 nm to cause heat to be dispersed into the adjacent track through the heat sink layer at the time of recording of information and a cross-erase is easily generated.

For example, under the standard of DVD-RAM with 2.6 GB/screen, since laser with a laser wavelength ($\lambda$) being 645 to 660 nm is metered with a lens having a number of aperture (NA) of lens of 0.6, it is possible to perform a recording and a reproduction under application of the laser beam spot of 0.97 to 0.99 μm (0.9λ/NA). Due to this fact, it is also possible to cancel the cross-talk even in the case that the track pitch is set to 0.7 μm or less. To the contrary, the track pitch under the standard of DVD-RAM with 2.6 GB/screen is set to 0.74 μm. Its reason consists in the fact that a cross-erase is generated in the case that the track pitch is made narrower than this value.

Accordingly, development of a technology for reducing the cross-erase is a substantial problem.

Additionally, a film structure of rewritable type optical disk is a multi-interference structure in which a dielectric member protective layer (hereinafter called as an under protective layer) such as $Si_2N_4$, $ZnS—SiO_2$, a recording layer represented by TbFeCo type magnetic film or a chalcogenide type phase change film such as GeSbTe and the like, a dielectric member protective layer similar to the under protective layer (hereinafter called as a heat sink control layer) are laminated in sequence on a transparent substrate made of the plastic material and further there is provided a metal reflection film (hereinafter called as a heat sink layer) made of Al alloy, Au alloy and the like. A feature of this structure consists in attaining a high carrier wave to noise ratio by insisting a variation in optical characteristic value in the recording layer and reflecting light through setting refraction rates of each of the under protective layer, the recording layer, the heat sink control layer and the heat sink layer and setting of the film thickness to a proper value.

A function of the heat sink layer consists in reflecting light passed through the under protective layer, the recording layer and the heat sink control layer and in returning it to the incident side. Accordingly, it is required that its reflectivity is optically high. However, in general, a thermal conductivity of high reflectivity metal such as Al, Au, Pd, Pt, Cu and Ag or the like is quite high, so that some problems are generated as follows.

In the case that the heat sink layer has a high thermal conductivity, it means that heat generated at the recording layer may easily be dispersed into the heat sink layer, so that temperature at the recording layer is hardly increased and a laser power required for recording operation is increased (the recording sensitivity is reduced) (a problem of recording sensitivity).

In order to solve the problems, it is well known in the art to provide a method in which the two heat sink layers are arranged, a thermal conductivity of the heat sink layer near the recording layer is set as a low thermal conductivity and the side of the heat sink layer is provided with a heat sink layer having a high relative thermal conductivity (the prior art 4: Japanese Patent Laid-Open No.Hei 3-272032).

However, since the reflectivity of the low thermal conductivity metal satisfying the thermal conditions was 60%, the low thermal conductivity metal film could not sufficiently satisfy the optical characteristic as the reflective film, resulting in that a signal encoding degree of the reproducing signal, CNR ratio (a carrier wave to noise ratio) and an entire reflectivity of the multiplex interference structure or the like were hardly set to sufficient higher values (a problem of low CNR).

In addition, in the case that the heat sink layer has a high thermal conductivity, there may occur a phenomenon (a cross-erase) that heat is easily dispersed into a direction of plane of the heat sink layer and under influence of this heat, information recorded at the adjacent track is deleted (a problem of the cross-erase).

In addition, when the recording film of the rewritable type optical disk is made of phase change recording material, these information recording media are comprised of a protective layer, a recording film such as GeSbTe, a protective layer and a reflection area of GeSbTe on the substrate, and the reflectivity at the crystalline state is higher than that of amorphous state. With such an arrangement as above, the absorbing rate at the recording film shows a higher value at its amorphous state. If an over-writing is carried out under this state, the recording mark under its amorphous state may absorb light more easily than its crystalline state, resulting in that its temperature may easily be increased, and a size of the mark newly recorded is increased more than its normal size and a certain strain is generated at the reproducing signal.

In order to prevent this phenomenon, a trial has been accomplished to increase an absorbing rate under a crystalline state at the recording film than that of its amorphous state. For example, there are present a case in which a relation between an absorbing rate under a crystalline state and an absorbing rate under an amorphous state is reversed under an arrangement of a quite thin Au reflective layer with a thickness of 10 nm (the prior art 5: Shingaku Technical Bulletin MR92-71, CPM92-148 (1992-12) P.37) or a case in which a relation between an absorbing rate under a crystalline state and an absorbing rate under an amorphous state is reversed under an arrangement of Si at a reflective layer with a thickness of 65 nm (the prior art 6: Shingaku Technical Bulletin MR93-53, CPM93-105 (1993-12) P.1).

However, since any of these methods has no heat sink layer of sufficient thickness, it is not possible to perform a fast cooling of the recording film after the recording film is melted. Due to this fact, there occurs a problem that the recording film is deteriorated after performing the re-writing operation for several times (a deterioration problem of recording film when the re-writing operation is performed by several times).

In addition, in order to solve the problems above, there is provided a method in which two reflective layers are arranged at a side of the recording film opposite to the laser beam incident side, the reflective layer near the recording film is applied as Si and the other reflection film (a heat sink layer) is applied as an Al alloy, thereby a relation between the absorbing rate under the crystalline state and the absorbing rate under the amorphous state is reversed (the prior art 7: Proceeding of International Symposium on Optical Memory 1995, pp 151–152). Although this method is a superior one, reversing of the absorbing rate cannot be carried out sufficiently; since a thickness of the Si thin film must be limited to 50 nm to 100 nm in order to attain an optical superior multi interference structure, so that a degree of freedom in heat design is reduced; in addition, since there is provided a sufficient heat sink layer (a protective layer present between the recording layer and Si thin film), heat is dispersed to the adjacent track through the Si thin film having a high thermal conductivity and a heat sink layer (Al alloy) to generate the cross-erase. Further, since the semiconductor film such as Si or the like has normally a low film-forming rate, its productivity is not superior and it shows a certain problem in its production.

As described above in detail, when a high-density recording is carried out, various kinds of problems may occur. In particular, in the case that a high-density recording is carried out with a track pitch being less than 70% or less, a technology for remarkably reducing the cross-erase is an essential one.

Although all the methods were superior methods, a high-density recording to have the track pitch of 70% or less of the laser spot diameter was not sufficiently assumed such that the track pitch becomes 70% or less of the laser beam spot diameter, resulting in that all these methods could not reduce the cross-erase sufficiently. In addition, it is apparent that the structure where the cross-talk may easily occur is a structure in which a flow of heat from the land to the groove or from the groove to the land is substantially high. Further, in the case that the flow of heat between the land and the groove is high, there occurs a problem that the laser power required for the recording operation is different for the case of recording at the land and for the case of recording at the groove, respectively, when information is recorded at both land and groove as described later.

It is an object of the present invention to provide an information recording medium in which CNR, an over-writing characteristic and a recording sensitivity are not reduced even under a high-density recording in which the track pitch becomes 70% or less of the laser beam spot diameter and further no cross-erase is produced.

Further, it is another object of the present invention to enable a narrow track pitch to be realized even in a high-density recording in which the track pitch becomes 70% or less of the laser beam spot diameter without reducing CNR, an over-writing characteristic and a recording sensitivity and to realize an information recording medium of high recording density corresponding to an information recording and reproducing apparatus using a low-cost semiconductor laser.

Further, it is another object of the present invention to enable a narrow track pitch to be realized even in a high-density recording in which the track pitch becomes 70% or less of the laser beam spot diameter without reducing CNR and a recording sensitivity and in particular to provide an information recording medium in which a superior over-writing characteristic is realized even under a high-density recording where a recording mark length may become a half or less of an energy beam spot diameter.

Further, it is a further object of the present invention to enable a narrow track pitch to be realized even in a high-density recording in which the track pitch becomes 70% or less of the laser beam spot diameter without reducing CNR, an over-writing characteristic and a recording sensitivity and to provide an information recording medium in which a reproducing signal is not deteriorated even after many times of re-writing operation of about 100,000 times.

Further, it is a still further object of the present invention to enable a narrow track pitch to be realized even in a high-density recording in which the track pitch becomes 70% or less of the laser beam spot diameter without reducing CNR, an over-writing characteristic and a recording sensitivity and further to provide an information recording medium in which no difference is produced in a recording sensitivity between a case having information recorded at the groove and a case having information recorded at the groove.

DISCLOSURE OF THE INVENTION

In order to solve the problems in the prior art described above and to accomplish the objects of the present invention, it is satisfactory to apply the following information-recording medium.

(1) An information-recording medium in which an atomic arrangement is changed under radiation of energy beam moved in a relative manner and/or information (a recording mark) is recorded under changing of electronic state, there are provided a plurality of information recording tracks in parallel with the relative moving directions, there is provided a step between the information recording tracks, one or more kinds of information recording thin films are provided as recording layers, sides of the recording layers opposite to the energy beam incident side are provided with one or more kinds of heat sink control layers and a heat sink layer having different composition against the heat sink control layer, a sum of film thicknesses of the more than one kind of recording layer is equal to or less than a step between information recording tracks, and a sum of film thicknesses of the more than one kind of heat sink control layer is equal to or more than a step between the information-recording tracks, thereby these features realize an information recording medium in which reduction of cross-erase, high CNR and improvement of durability against deterioration caused by re-writings of many times and further even in the case that information is recorded at both land and groove, quality of the reproducing signal attained from the land and the groove is not substantially different. Further, even in the case of high-density recording in which the track pitch is 70% or less of the laser beam spot diameter, the narrow track pitch can be realized without reducing CNR, over-writing characteristic and recording sensitivity, and an information recording medium is realized in which no difference in recording sensitivity is produced under a case in which information is recorded at the land and another case in which information is recorded at the groove. In particular, in the case that a sum of film thicknesses of the more than one kind of recording layers is 5 nm or more and 20 nm or less, the information recording medium with high CNR can be attained due to the fact that an optical interference effect between the heat sink layer and the recording layer can be effectively utilized under an easy permeation of laser light through the recording layer. In addition, in the case that a sum of film thicknesses of the more than one kind of heat sink control layer is more than a step between information recording tracks and 300 nm or less and more preferably 70 nm or more and 150 nm or less, its productivity is improved in addition to the effect.

(2) The information-recording medium according to (1) above is made such that a step between the information recording tracks is a step of notch and protrusion shape (a groove shape) and each of adjacent notch (a groove section) and adjacent protrusion (a land section) is provided with an information recording track, thereby a narrow track pitch of the information recording track can be realized without increasing a cross-erase.

(3) The information recording medium according to (1) and (2) above in which the information recording tracks are arranged under a certain track pitch (a distance between the center lines of the information recording tracks) and the track pitch is 50% or more and 70% or less of the energy beam spot diameter; and/or (4) The information recording medium according to (3) above is made such that the energy beam is a laser beam, and a track pitch is more than 5λ/NA and less than 0.6λ/NA, where λ denotes a laser wavelength applied in the laser beam and NA denotes the number of apertures of a lens for forming the laser beam, wherein the highest effect of the present invention appears in the information recording medium.

(5) The information-recording medium according to (4) above is made such that the information-recording medium is provided with a transparent substrate at an energy beam incident side, the energy beam is a laser beam, wherein a step (a groove depth) between a center of the notch and a center of the protrusion of the notch and protrusion shapes is $\lambda/(7n)$ or more and $\lambda/(6.2n)$ or less, where $\lambda$ denotes a laser wavelength of the laser beam and (n) denotes a refractive index of the transparent substrate at the wavelength $\lambda$, thereby not only the cross-talk can be reduced, but also the cross-erase can be reduced without reducing a recording sensitivity, CNR and durability against multi-rewriting operation.

(6) The information recording medium according to any one of (4) and (5) above is made such that the information-recording medium is provided with a transparent substrate at an energy beam incident side, the energy beam is a laser beam, wherein a laser wavelength of the laser beam is 630 to 660 nm, the number of apertures of a lens for forming the laser beam is 0.57 to 0.643, a refractive index of the transparent substrate in the wavelength range is 1.45 to 1.65, a track pitch is 0.615±0.03 μm and the groove depth is 59 to 67 nm, thereby it is possible to realize the information recording medium having a high recording density such as a DVD-RAM with a recording capacity of 4.7 GB.

(7) The information-recording medium according to any one of (1) and (2) above, wherein the one kind or more of heat sink control layers contains metal oxide, carbide, nitride, sulfide and selenide; and/or (8) The information-recording medium according to (7) above, wherein at least one kind of heat sink control layer in one kind or more of the heat sink control layer contains an S element; and/or (9) The information recording medium according to (8) above, wherein an amount of inclusion of S element is 5% or more and 50% or less, a phenomenon of inverse flow of heat from the heat sink layer to the recording layer can be reduced due to the fact that a thermal conductivity of the heat sink control layer can be reduced by 1W/mK and the cross-erase can be reduced without reducing a recording sensitivity, CNR and durability against multi-rewriting operation.

(10) The information-recording medium according to any one of (1) and (2) above, wherein there is provided the heat sink layer having a total amount of inclusion of Al, Cu, Ag, Au, Pt and Pd of more than 90%; and/or

(11) The information-recording medium according to (10) above, wherein there is provided the heat sink layer having an amount of inclusion of Al element of 97% or more; and/or

(12) The information-recording medium according to (10), wherein a film thickness of the heat sink layer is 30 nm or more and 300 nm or less and the cross-erase can be reduced without reducing a recording sensitivity, CNR and durability against multi re-writing operation during recording in which the recording layer is not only for a phase changed recording layer having as its major constituents Ge, Sb, Te, In, and Ag or the like, but also for an optical magnetic recording layer having as its major constituents Tb, Fe, Co, Dy and Gd or the like, for example.

(13) The information-recording medium according to any one of (1) to (12) above, wherein recording of information (a recording mark) is carried out under a changing from a crystalline state to amorphous state and/or from an amorphous state to crystalline state as the changing of atomic arrangement is performed, a narrow track pitch can be realized without reducing CNR, over-writing characteristic and recording sensitivity even under a high-density recording having a track pitch less than 70% of the laser beam spot diameter and it is possible to realize the information recording medium having a superior compatibility with the exclusive reproducing optical disk (for example, DVD-ROM) such as DVD-RAM, DVD-RW and DVD-R, for example.

(14) The information recording medium according to (13) above, wherein a rate of inclusion of S element is lower than a rate of inclusion of S element present in at least one kind of the heat sink control layer in the heat sink control layers and there is provided a thermal buffer present between the heat sink control layer and the heat sink layer; and/or

(15) The information recording medium according to (14) above, wherein thermal buffer layer is of a mixture material of metal, metal oxide, metal nitride and metal carbide; and/or

(16) The information recording medium according to (14) above in which a sum of film thicknesses of the heat sink control layer is more than a film thickness of thermal buffer layer, wherein a narrow track pitch can be realized without reducing CNR and a recording sensitivity under a high density recording where the track pitch is 70% or less of the laser beam spot diameter and a superior over-writing characteristic can be realized even under a high-density recording such that a recording mark length, in particular, may become a half size of an energy beam spot diameter.

(17) The information recording medium according to (14) above in which recording of information is carried out under recording of recording marks of a plurality of lengths and a length of the shortest recording mark in the recording marks of a plurality of lengths is 40% or more and 50% or less of an energy beam spot diameter, wherein the effect of the present invention remarkably appears.

(18) The information recording medium according to (13) above, wherein there are provided at least a plurality of heat sink control layers, a rate of inclusion of S element is lower than a rate of inclusion of S element present in at least one kind of heat sink control layer in other heat sink control layers and there is provided an interface layer present while being in contact with the recording layer, wherein a narrow track pitch can be realized without reducing CNR, an over-writing characteristic and a recording sensitivity and further a reproducing signal is not deteriorated after re-writing operation of many times of about 100,000 times even under a high density recording where the track pitch is 70% or less of the laser beam spot diameter.

In the present invention, although a plurality of thin films are laminated to realize a characteristic of each of the thin films, it is not necessary that teach of the layer is strictly divided, if it is about 5 nm or less, for example, even if a composition ratio near an interface between each of the layers is changed continuously, the effect of the present invention is not lost. In addition, composition of each of the films in the present invention is indicated by an atomic %.

In addition, the energy beam spot diameter in the present invention is meant by a diameter of region where its intensity becomes $1/e^2$ or more of a central intensity of the beam spot. Further, the present invention provides an effect for improving a recording density in a direction in parallel with the information recording track (an effect where a superior over-writing characteristic is realized also when the record marks with a size of 50% or less of the energy beam diameter) and an effect for improving a recording density in respect to a vertical direction of the information recording track (an effect for restricting a cross-erase and a cross-talk even under a case in which the track pitch is 70% or less of the energy beam diameter). The energy beam spot diameter in the present invention is meant by a width of region where its intensity is more than $1/e^2$ or more of the central intensity of the beam spot in such a direction as one where each of the effects may appear in the case that a beam spot shape is an ellipse other than a circle, for example.

Further, definitions of each of the interface layer, the heat sink control layer, thermal buffer layer and the heat sink layer are set as follows. The interface layer is a layer which is present between the recording layer and the heat sink control layer to stabilize an interface at the recording layer, wherein an amount of inclusion of at least S element is smaller than an amount of inclusion of one kind of layer in the heat sink control layers and a film thickness is 2 to 10 nm. For example, if the composition of it is apparently different from that of the recording layer or the heat sink control layer when the surface of the recording layer is changed (nitriding, oxidization and the like) due to a certain processing at the surface of the recording layer, this is called as an interface layer.

In addition, the heat sink control layer is meant by a layer in which at least a film thickness is larger than 10 nm, it is present between the recording layer and the heat sink layer and as its major constituents, oxides, carbides, nitrides, sulfides and selenides for permeating the energy beam are applied and (k) in a plurality of refractive indexes (n), (k) at least at the wavelength of the energy beam is −0.1 or more.

In addition, the heat sink layer is meant by a layer that is present at least between the heat sink control layer and the heat sink layer, (k) in a plurality of refractive indexes (n), (k) is lower than −0.1 and a film thickness is 100 nm or less.

BEST MODE FOR CARRYING OUT THE INVENTION

Figure 1:
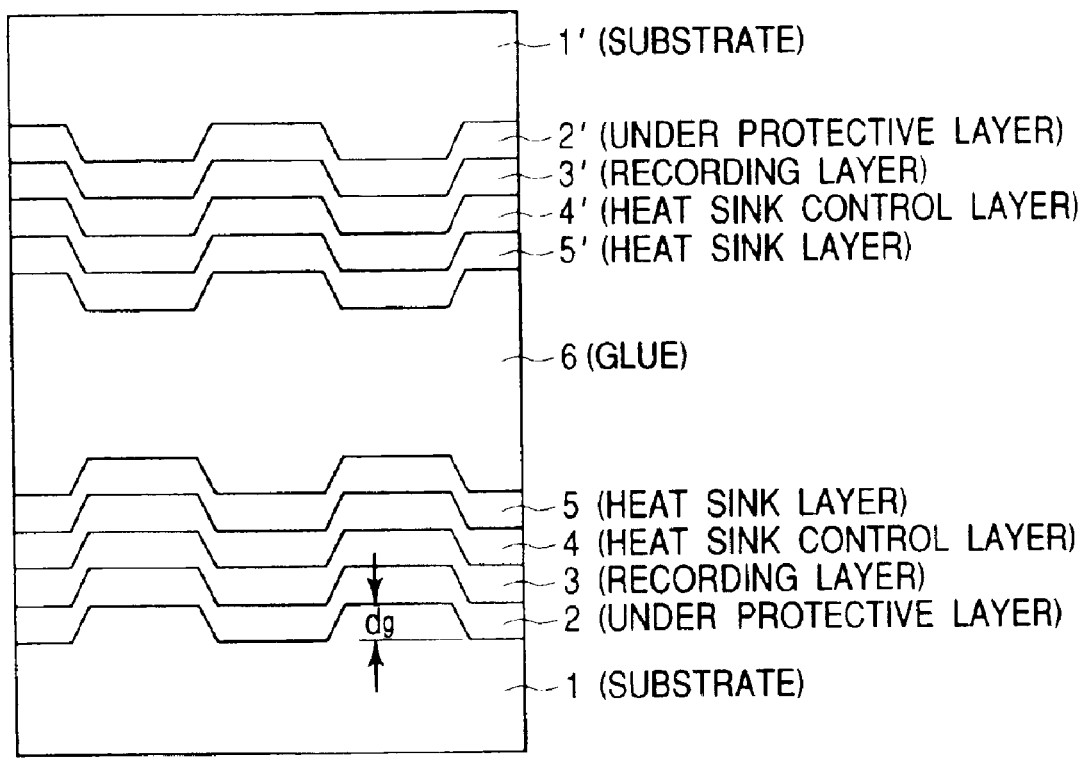
FIG. 1 is a view for showing a structure of the information-recording medium of the present invention.

Referring now to the accompanying drawings, the present invention will be described in details as follows. The reference numerals used for explaining the present invention are defined as follows.

| | |
|---|---|
| 1, 1': | substrate |
| 2, 2': | under protective layer |
| 3, 3': | recording layer |
| 4, 4': | heat sink control layer |
| 5, 5': | heat sink layer |
| 6: | glue |
| $d_g$: | groove depth |
| 7: | objective lens |
| 8: | energy beam |
| 9: | heat-generating section |
| 10: | interface with the adjacent track |
| 11: | recording section in the adjacent track |
| $d_{hc}$: | film thickness of the heat sink control layer |
| $d_m$: | shortest distance between the recording section in the adjacent track and the heat sink layer |
| $d_t$: | film thickness |
| 12, 12': | under interface layer |
| 13, 13': | upper interface layer |
| 14, 14': | thermal buffer layer |
| 10-1: | optical disk |
| 10-2: | motor |
| 10-3: | optical head |
| 10-4: | pre-amplifier circuit |
| 10-6: | recording waveform generator |
| 10-7: | laser-driving circuit |
| 10-8: | 8–16 encoder |
| 10-9: | L/G servo circuit |
| 10-10: | 8–16 decoder |
| 15: | optical disk |
| 16: | optical disk |
| 17: | record mark in adjacent track |
| 18: | central track |
| 19: | center of track |
| 20: | laser beam |
| 21: | cross-erase observing point |

The present invention will be described as follows in reference to each of its preferred embodiments.

At first, a preference of the present invention against the cross-erase will be described. The cross-erase is a phenomenon in which heat generated when the laser beam is radiated against the recording layer for recording a record mark is transmitted in the laminated thin films to delete information recorded in the adjacent track, and this is one of the most substantial troubles occurred when the high density recording is carried out. At first, referring to FIGS. 1 to 8, the effect of the present invention for reducing the cross-erase will be described.

In FIG. 1 is illustrated a basic structure of an information recording medium of the present invention. A first information recording member has a structure in which an under protective layer 2, the recording layer 3, the heat sink control layer 4 and the heat sink layer 5 are laminated in sequence on the substrate 1 where a groove-shaped information recording track with a groove depth $d_g$. In addition, the information recording members having a similar structure as that before having a substrate 1', an under protective layer 2', a recording layer 3', a heat sink control layer 4' and a heat sink layer 5' are adhered to each other through glue 6.

Figure 2:
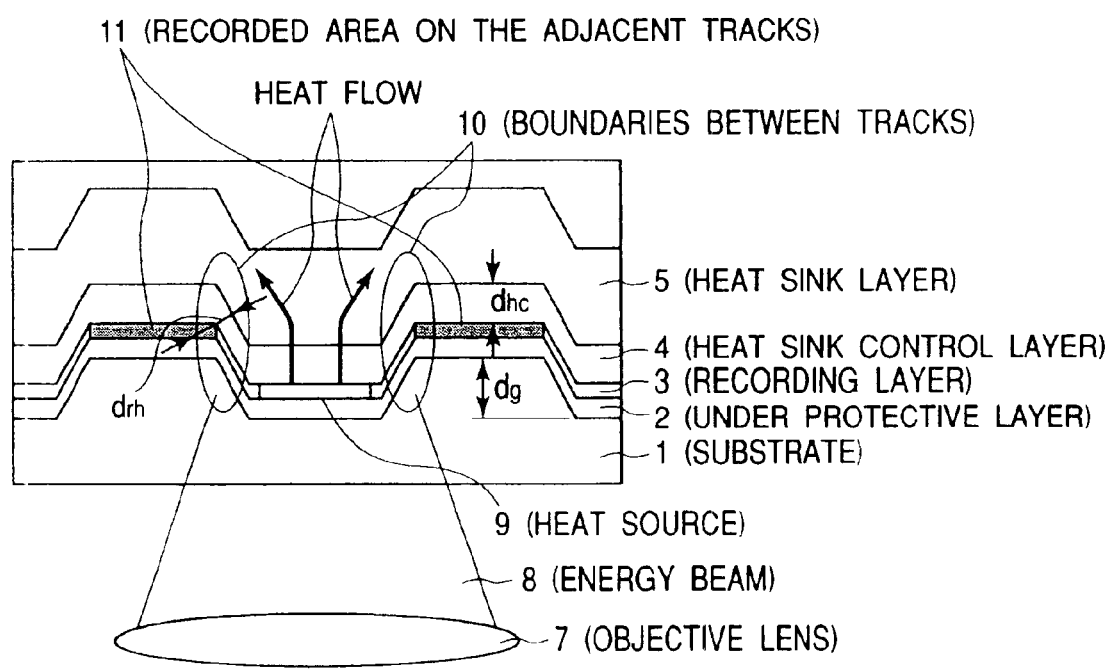
FIG. 2 is a schematic view of concept for illustrating one preferred embodiment of the present invention.
Figure 3:
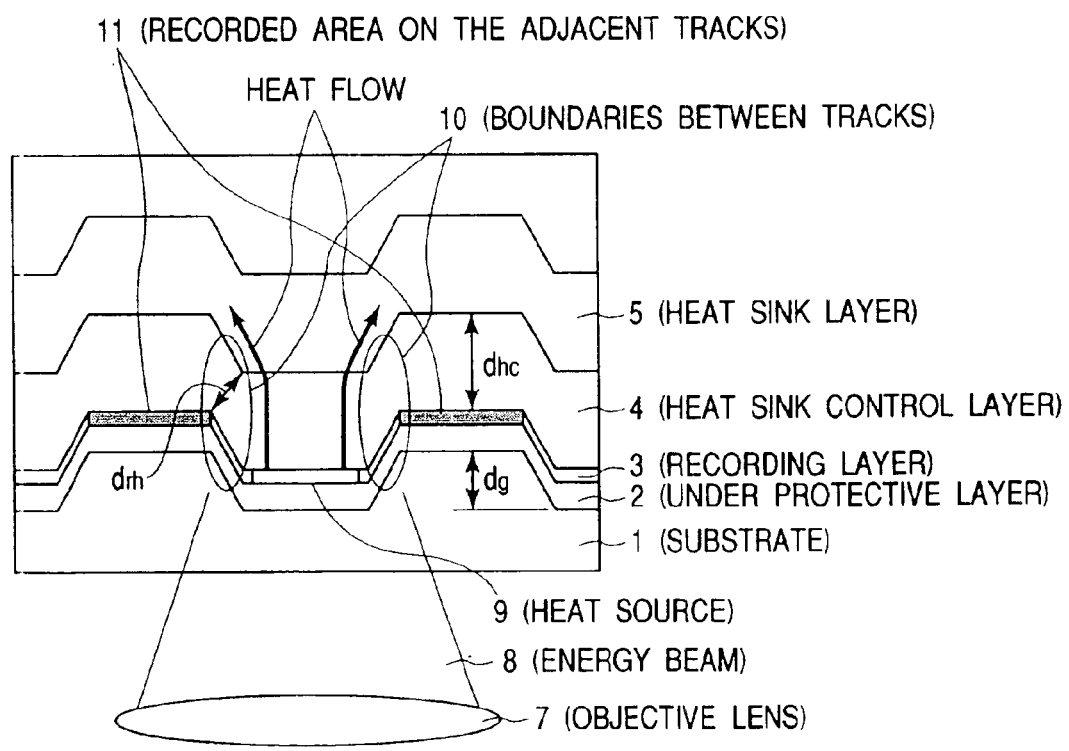
FIG. 3 is a schematic view of concept for illustrating one preferred embodiment of the present invention.

FIGS. 2 and 3 schematically illustrate a state of heat sink seen in a direction of sectional view in the case that the laser beam is radiated from the substrate 1 to generate heat at the recording layer 3. FIG. 2 illustrates a case in which a thickness $d_{hc}$ of the heat sink control layer 4 is thinner than a groove depth $d_g$ (structure A: corresponding to the prior art) and FIG. 3 illustrates a case in which $d_{hc}$ of the heat sink control layer 4 is thicker than the groove depth $d_g$ (structure B: the present invention). In this case, for sake of convenience in description, it is assumed that a relation in thermal conductivities in each of the layers has a thermal conductivity of a heat sink layer>a thermal conductivity in the recording layer>a thermal conductivity in the heat sink control layer=a thermal conductivity in the under protective layer.

At first, referring to FIG. 2, the present invention will be described. As already described above, in FIG. 2, the thickness $d_{hc}$ of the heat sink control layer 4 is made to be thinner than the groove depth $d_g$. The energy beam radiated against the recording layer 3 through the objective lens may generate heat at the recording layer 3. In addition, heat generated at the heat generating section 9 of the recording layer 3 is dispersed through the heat sink layer 5. At the interface 10 in regard to the adjacent track, the shortest distance $d_{rh}$ between the heat sink layer 5 and the recording section 11 of the adjacent track is low and the heat sink layer is present to enclose the recording section 11 of the adjacent track, resulting in that the cross-erase may easily be produced under influence of heat dispersed at the heat sink layer 5.

To the contrary, in the case of FIG. 3, since the thickness $d_{hc}$ of the heat sink control layer 4 is thicker than the groove depth $d_g$, the recording section 11 of the adjacent track is hardly influenced by heat dispersed at the heat sink layer 5. A reason why this state occurs consists in the fact that the shortest distance $d_{rh}$ between the heat sink layer 5 the interface section 10 with the adjacent track and the recording section 11 of the adjacent track is large as compared with the case shown in FIG. 2 and further the heat sink layer 5 is not present to enclose the recording section 11 of the adjacent track as shown in FIG. 2.

As described above, influence of heat applied to the recording section 11 of the adjacent track is made different in reference to the film thickness $d_{hc}$ of the heat sink control layer 4. This fact becomes quite important in view of restricting the cross-erase. A reason why this state is important consists in enabling the cross-erase to be restricted by restricting influence of heat applied to the recording section 11 of the adjacent track.

Figure 4:
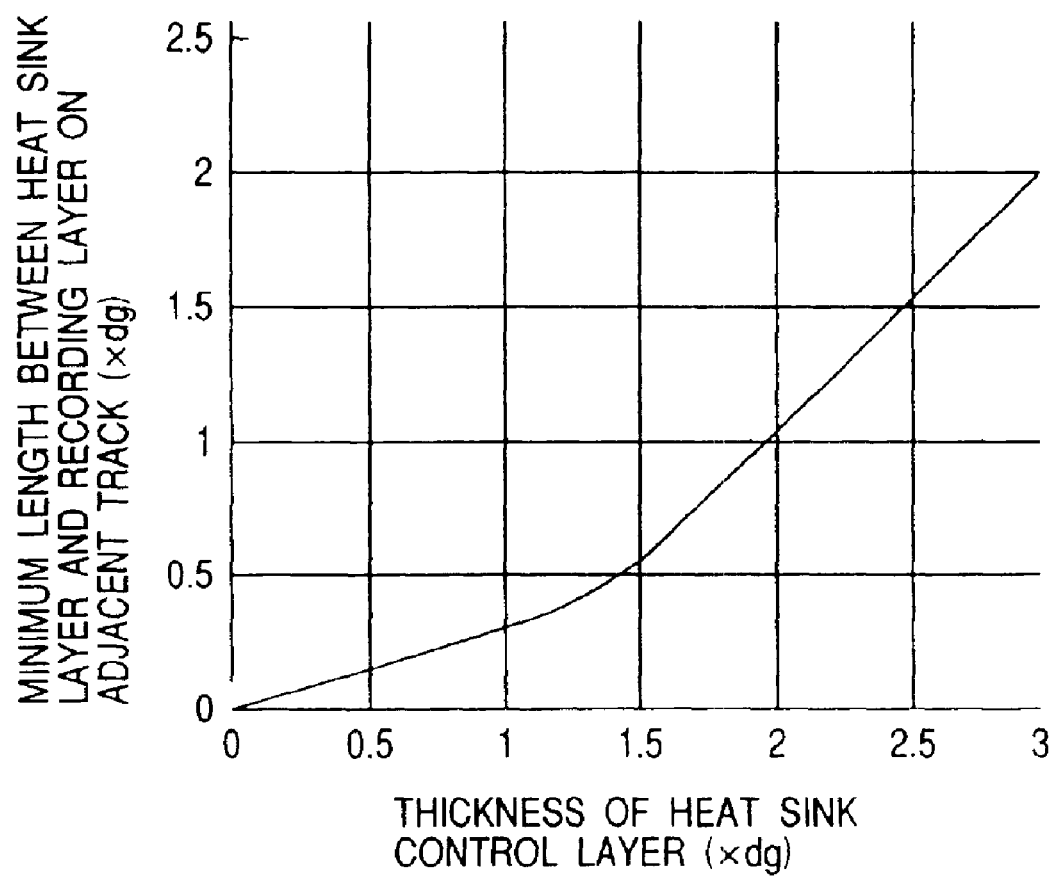
FIG. 4 is a view for showing a relation between a film thickness of the heat sink control layer and a distance between the heat sink layer and the adjacent track recording section.

FIG. 4 illustrates an example of calculation about a relation of the shortest distance $d_{rh}$ between the recording section 11 of the adjacent track and the heat sink layer 5 and a film thickness $d_{hc}$ of the heat sink control layer 4. In the case that the film thickness $d_{hc}$ of the heat sink layer 4 is more than the groove depth $d_g$, the shortest distance $d_{rh}$ between the heat sink layer 5 and the recording section 11 of the adjacent track is rapidly increased.

Figure 5:
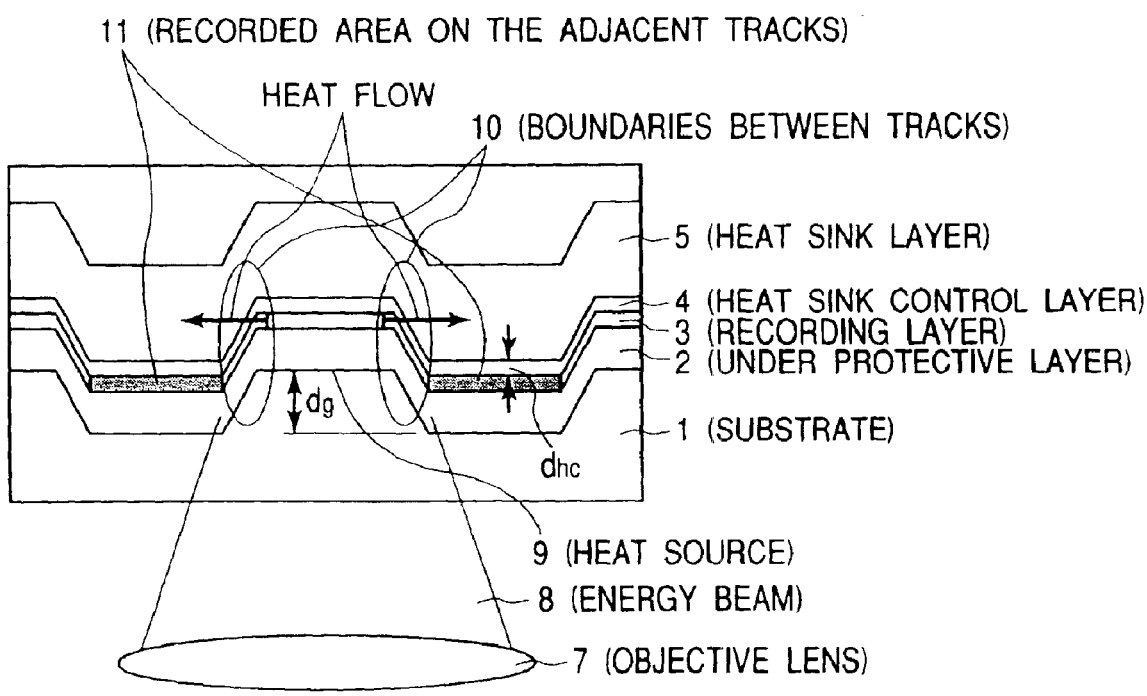
FIG. 5 is a schematic view of concept for illustrating one preferred embodiment of the present invention.

Although the case in which information is recorded at the recording layer of the groove has been described in the above example, the shortest distance between the recording section of the land and the heat sink layer shows a similar change in regard to the film thickness of the heat sink also when it is recorded at the land. In addition, as shown in FIG. 5, in the case that the film thickness $d_{hc}$ of the heat sink control layer 4 is less than the groove depth $d_g$, the heat generated at the heat generating section 9 may easily be dispersed toward the adjacent track due to the fact that the heat sink layer 5 is present to enclose the heat generating section 9 of the recording layer 3. As a result, the cross-erase may easily be generated at the adjacent track.

Figure 6:
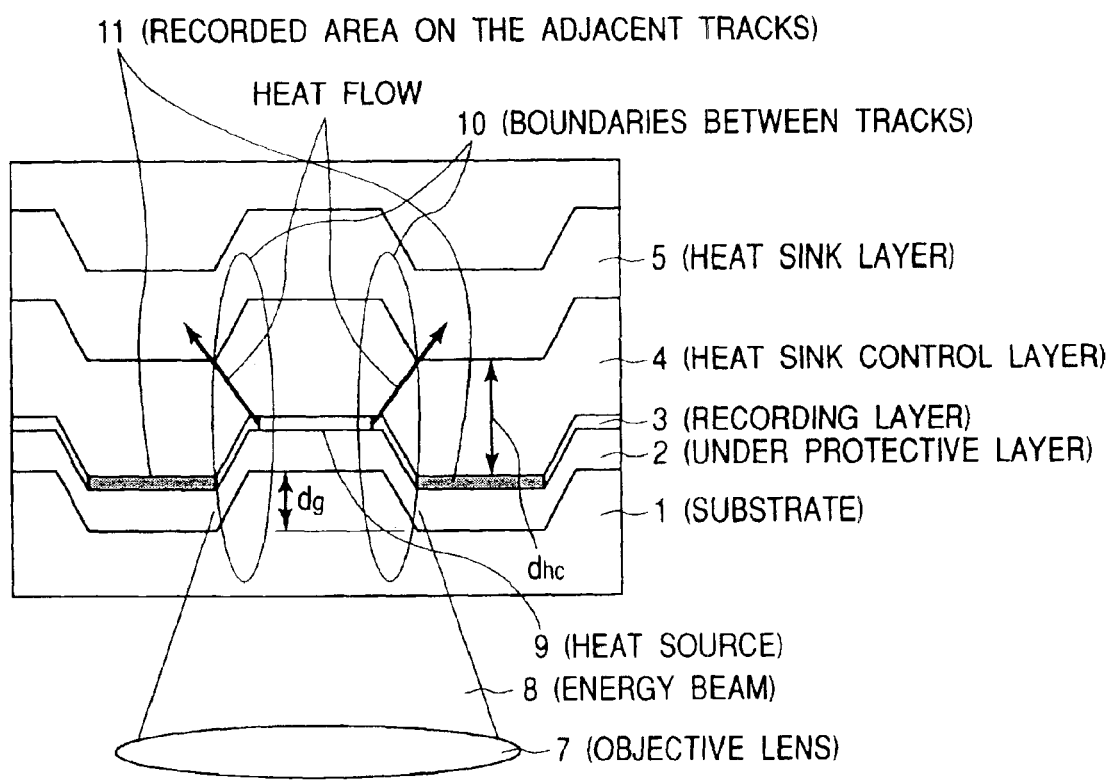
FIG. 6 is a schematic view of concept for illustrating one preferred embodiment of the present invention.

To the contrary, in the case shown in FIG. 6, since the film thickness $d_{hc}$ of the heat sink control layer 4 is thicker than the groove depth $d_g$, the recording section 11 of the adjacent track is hardly influenced by heat dispersed at the heat sink layer 5. A reason why this state occurs consists in the fact the heat sink layer 5 is not present to enclose the recording section 11 of the adjacent track as found in the case shown in FIG. 5. In this way, influence of heat generated at the land against the recording section of the groove can be explained in the same manner as that of recording at the groove and in accordance with the present invention, it is possible to restrict a flow of heat from the land to the groove or from the groove to the land. As described above, although the cross-erase can be reduced if the film thickness of the heat sink control layer is more than the groove depth, an effect of reducing the cross-erase may appear also in the case that in particular, the land and groove recording system is employed to record in formation at both land and groove.

Figure 7:
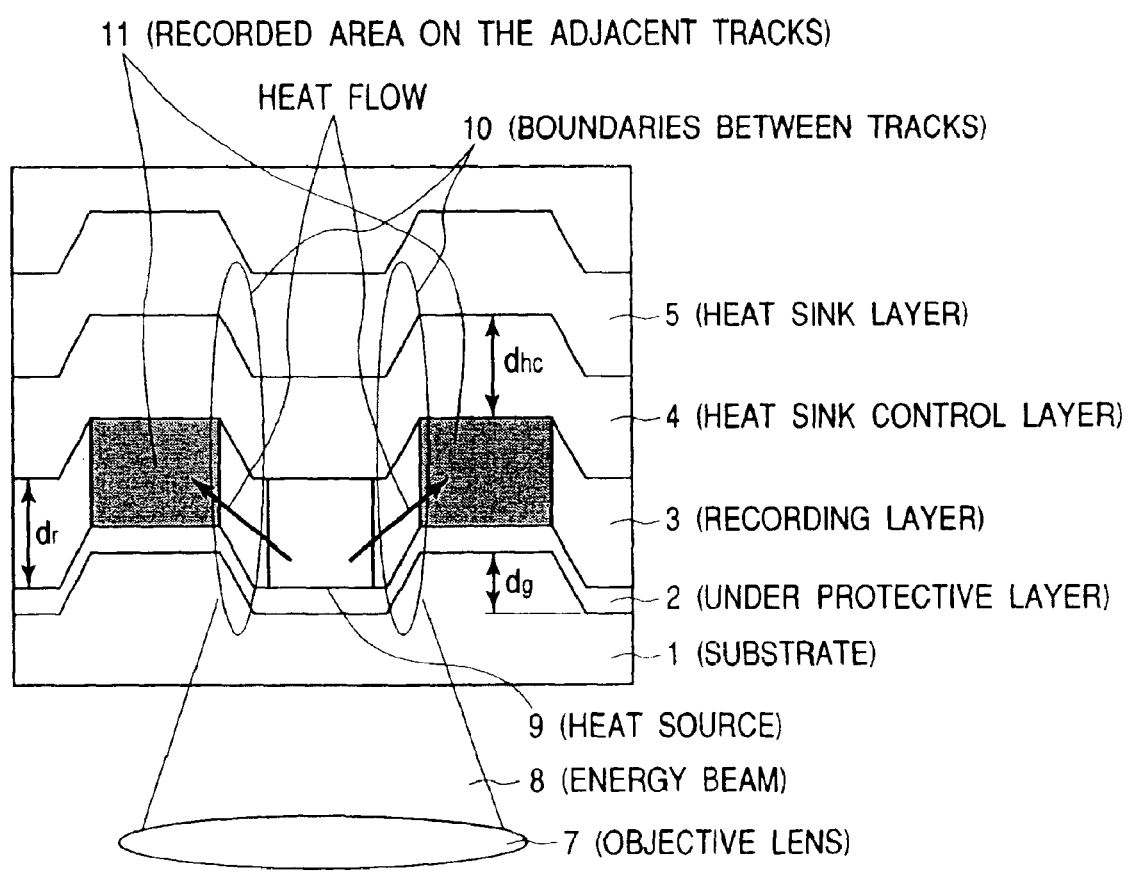
FIG. 7 is a schematic view of concept for illustrating one preferred embodiment of the present invention.

FIG. 7 is a view for schematically showing a state of heat sink when a laser beam is radiated against the groove in the case that the film thickness $d_r$ of the recording layer 3 is thicker than the groove depth $d_g$. In this case, as compared with FIGS. 2 and 3, a distance between the heat generating section 9 of the recording layer 3 of the groove and the recording section 11 of the adjacent track is reduced and a heating calorie dispersing in the recording layer having a relative high thermal conductivity is increased, resulting in that a cross-erase may easily be generated.

Figure 8:
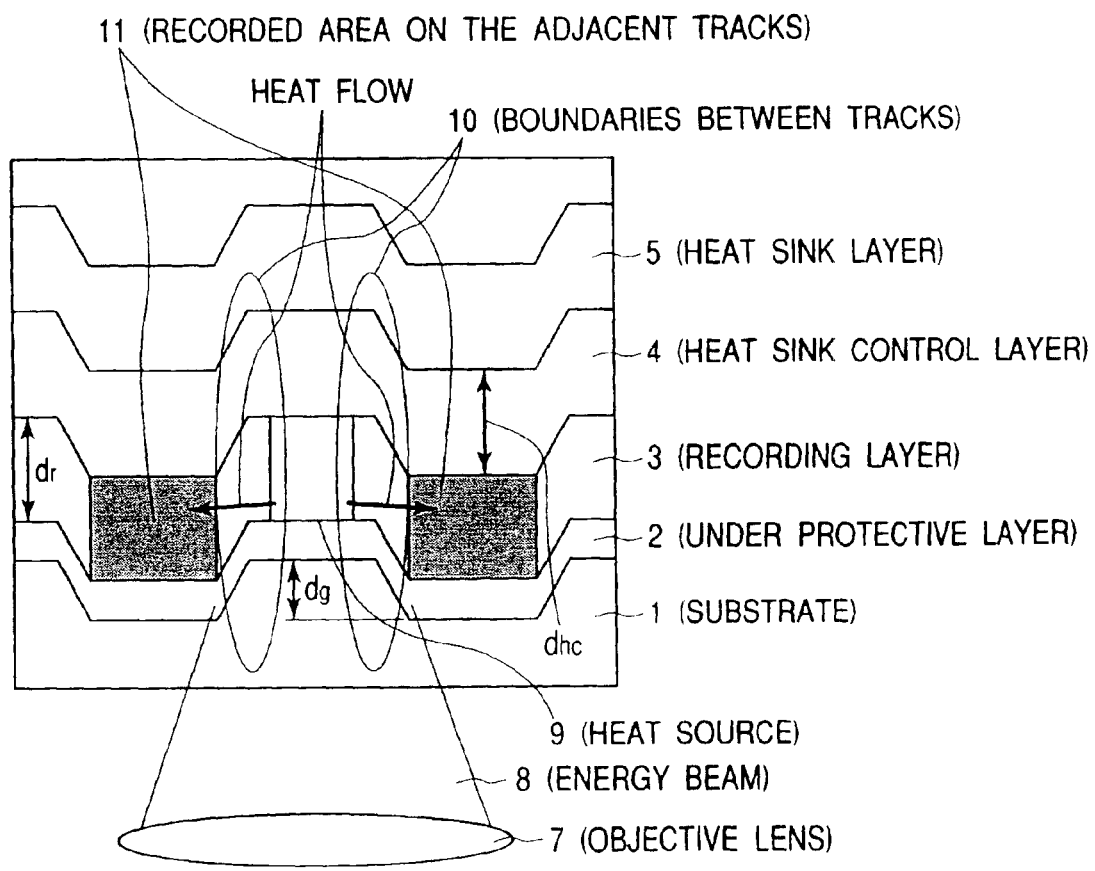
FIG. 8 is a schematic view of concept for illustrating one preferred embodiment of the present invention.

FIG. 8 is a view for schematically showing a state of heat sink when a laser beam is radiated against the land in the case that the film thickness $d_r$ of the recording layer 3 is thicker than the groove depth $d_g$. In this case, as compared with FIGS. 5 and 6, a distance between the heat generating section 9 of the recording layer 3 of the land and the recording section 11 of the adjacent track is reduced and a heating calorie dispersing in the recording layer having a relative high thermal conductivity is increased, resulting in that a cross-erase may easily be generated.

Further, in the case that the thickness $d_{hc}$ of the heat sink control layer 4 is thinner than the groove depth $d_g$ and the laser beam is radiated against the land as shown in FIG. 5, the recording sensitivity is reduced as compared with the case that the thickness $d_{hc}$ of the heat sink control layer 4 is thinner than the groove depth $d_g$ and the laser beam is radiated against the groove. In the case of the system shown in FIG. 2, the side surface of the heat generating section 9 of the recording layer 3 is provided with the under protective layer 2 and the substrate 1 having a relative low thermal conductivity and to the contrary, in the case of the system shown in FIG. 5, the side surface of the heat generating section 9 of the recording layer 3 is provided with the heat sink layer having a relative high thermal conductivity. This fact may cause a difference in recording sensitivity between the land and the groove, resulting in that this becomes a substantial problem in design of the information recording and reproducing apparatus.

Although there may be considered to provide a method for radiating the laser beam having a higher power than that of the case in which information is recorded at the groove when information is recorded at the land in order to overcome this problem, in this case, it is not preferable due to the fact that a new problem occurs in which across-erase may easily be generated at the adjacent groove.

In accordance with the information-recording medium of the present invention, it is also possible to reduce a difference in recording sensitivity between the land and the groove. In the case that the thickness $d_{hc}$ of the heat sink control layer 4 is thicker than the groove depth $d_g$ as shown FIGS. 3 and 6, in the case that information is recorded at the groove and in the case that information is recorded at the land, the side surface of the heat generating section 9 of the recording layer 3 is provided with the under protective layer or the heat sink control layer.

In view of the phenomenon, the present inventors have checked the relation among thermal conductivity, film thickness and cross-erase at each of the recording layer, the heat sink control layer and the heat sink layer and concurrently discovered that the most-suitable thermal conductivity and film thickness are present at each of the layers. In addition, the present inventors have calculated compositions of each of the layers for realizing the thermal conductivity. Examples in experiment are indicated as follows.

Each of thin films (the under protective layer 2: $(ZnS)_{80}(SiO_2)_{20}$ (100 nm), the under interface layer 12: $Cr_2O_3$ (5 nm) the recording layer 3: $Ag_6Ge_{16}Sb_{22}Te_{55}$ phase change recording layer (10 nm), the upper interface layer 13 (5 nm), the heat sink layer 4: $(ZnS)_{80}(SiO_2)_{20}$ (140 nm), thermal buffer layer 14: $Cr_{40}(Cr_2O_3)_{60}$ (35 nm), the heat sink layer 5: Al (80 nm) having a structure shown in FIG. 9 was formed in sequence through a sputtering process on the substrate 1 made of polycarbonate for land/groove recording with a track pitch of 0.4 to 0.75 μm, a groove depth of 62 nm and a thickness of 0.6 mm where address information for recording information at both land and groove is arranged at extremity end of each of the sectors.

Additionally, information recording members of similar structure having similar substrate 1', under protective layer 2', under interface layer 12', recording layer 3', upper interface layer 13', heat sink control layer 4', thermal buffer layer 14' and heat sink layer 5' were adhered to each other through glue 6. The information-recording medium having the configuration is called as an optical disk. A refractive index of the polycarbonate substrate was 1.58. (A range of appropriate film thickness and composition of each of the thin films constituting the optical disk 15 will be described later.)

There are 36 recording zones applied for a user in a radial direction of this disk and there are 25 to 60 sectors within one circumference in each of the zones. In addition, a track pitch is changed by 0.4 to 0.75 μm for every zone and a track pitch dependability of the cross-erase can be measured.

Figure 10:
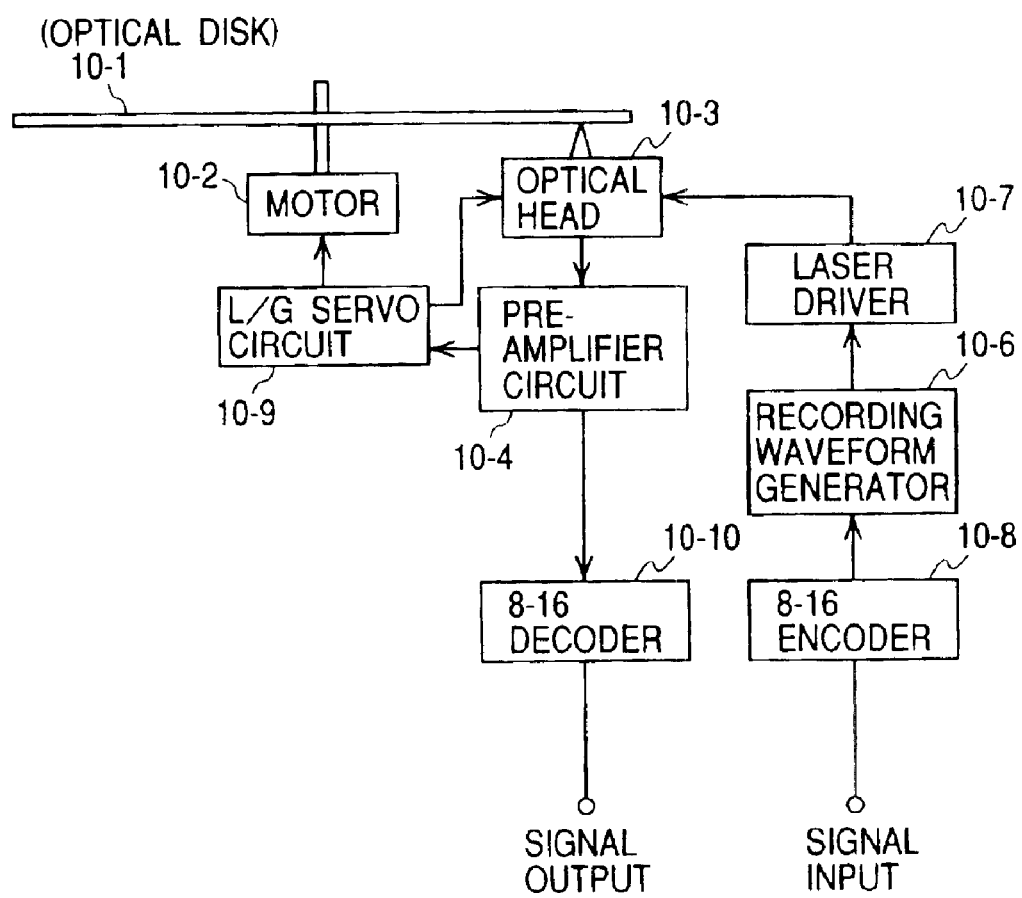
FIG. 10 is a block diagram for showing the information recording and reproducing apparatus applied in one preferred embodiment of the present invention.

Information was recorded and reproduced against the optical disk 15 (in FIG. 10, this is conveniently called as 10-1) by the information recording and reproducing apparatus shown in FIG. 10. Operation of the information recording and reproducing apparatus of the present invention will be described as follows. As a motor controlling method applied in the case of performing the recording and reproducing operation, a ZCLV (Zone Constant Linear Velocity) system in which the number of rotation of the disk is changed for every zone where the recording and reproducing operation is performed. A disk linear speed is 8.3 m/sec.

Information applied out of the recording device is transmitted to 8-16 encoder with 8 bits being applied as 1 unit. When information was recorded on the disk 1, an encoding system for converting 8 bits of information into 16 bits, a so-called 8-16 encoding system was applied and recording was carried out. In this encoding system, information having a mark length of 3T to 14T corresponding to 8-bit information is recorded on the medium. The 8-16 encoder 10-8 in the figure performs this encoding operation.

A symbol "T" used herein denotes a period of clock when information is recorded and its actual value was 17.1 ns.

The digital signal with a period of 3T to 14T converted through 8-16 encoder 10-8 is transferred to a recording waveform generator 10-6, wherein a width of high power pulse is set to about T/2, a laser radiation with a low power level having a width of about T/2 is carried out while a laser radiation of high power level is being applied, and a laser radiation of intermediate power level is carried out among the series of high power pulses to generate a multi-pulse recording waveform. In this case, a high power level for forming the recording mark was 11.0 mW, an intermediate power level capable of deleting the recording mark was 4.0 mW and a low power level lower than the intermediate power level was 3.0 mW. In addition, some signals with 3T to 14T are alternatively corresponded to "0" and "1" in time-series within the recording waveform generator 6, wherein if the signal is "0", the laser power of intermediate power level is radiated and if the signal is "1", a series of rows of high power pulses including pulses of high power level are radiated. In this case, the location on the optical disk 1 where the laser beam of intermediate power level is radiated becomes a crystal (a space section) and another location on the optical disk where the laser beam of a series of high power pulse rows including pulses of high power level is radiated is changed into amorphous state (a mark section). In addition, the recording waveform generator 10-6 has a multi-pulse waveform table corresponding to a system where an extremity end pulse width and the rear-most pulse width of the multi-pulse waveform are changed in response to a length of the space section across the mark section when a series of high power pulse rows including a high power level for use in forming the mark section (an adaptation type recording waveform control) are formed, thereby a multi-pulse recording waveform capable of eliminating influence of inter-mark thermal interference generated between the marks as much as possible is produced.

The recording waveform generated by the recording waveform generator 10-6 is transferred to the laser driving circuit 10-7 and then the laser driving circuit 10-7 emits the semiconductor laser within the optical head 10-3.

Within the optical head 10-3 mounted in the present recording apparatus is used a semiconductor laser with a light wavelength of 655 nm as an energy beam for use in recording information. In addition, information was recorded by a method wherein this laser beam was metered onto a recording layer on the optical disk 12 through an objective lens with a lens NA 0.6 and the laser beam with energy corresponding to the recording waveform was radiated.

In general, in the case that laser beam with a laser wavelength λ is condensed through a lens with lens NA number, a spot diameter of the laser beam becomes about 0.9×λ/NA. Accordingly, the spot diameter of the laser beam under the condition is approximately 0.98μ. At this time, an eccentric light of the laser beam is applied as a circular eccentric light.

In addition, the present recording apparatus corresponds to a system (a so-called land and groove recording system) for recording information to both groove and land (an area between grooves). In the present recording apparatus, a tracking against the land and the groove can be optionally selected through an L/G servo circuit 10-9.

The recorded information was also reproduced through application of the optical head 10-3. A laser beam is radiated onto the recorded mark and the reflected light from the mark and the portion except the mark is detected to attain a reproducing signal. Amplitude of this reproducing signal is increased through the pre-amplifier 10-4 and transferred to the 8-16 decoder 10-10. At the 8-16 decoder 10-10, this signal is converted into information of 8 bits every 16 bits. With the operation, reproduction of the recorded mark is completed.

In the case that recording is performed on the optical disk 12 under the condition, a mark length of 3T mark that is the shortest mark becomes about 0.42 μm and a mark length of 14T mark that is the longest mark becomes about 1.96 μm.

Figure 11:
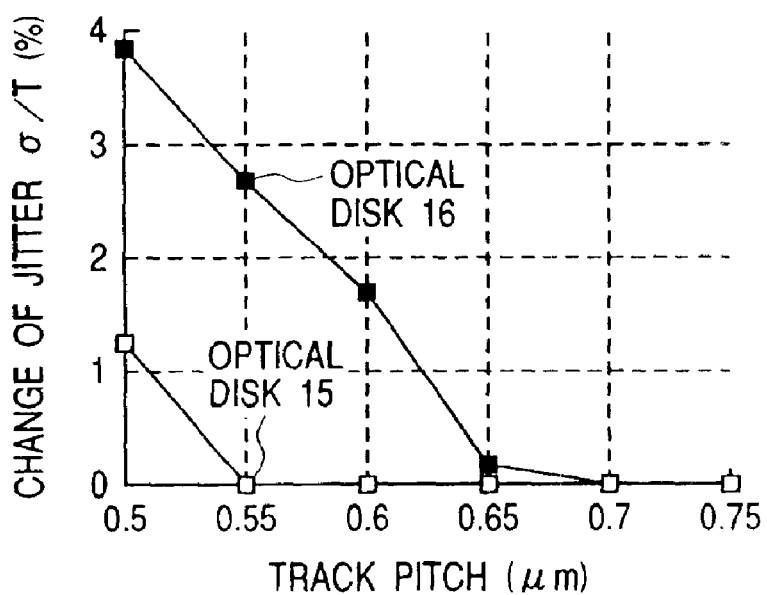
FIG. 11 is a view for showing a relation between a track pitch and an increased jitter caused by the cross-erase of the information-recording medium in one preferred embodiment of the present invention.

After information is recorded at the groove under the condition, information is further recorded at the adjacent track (land), a jitter increased amount caused by the cross-erase of the reproduced signal at the groove is measured, and this is indicated in FIG. 11.

In addition, an optical disk 16 having a similar structure to that of the optical disk except the fact that the film thickness of the heat sink control layer is 15 nm is made, a jitter increased amount of the reproduced signal at the groove caused by the cross-erase is measured and this is indicated in FIG. 11. In this case, power at the optical disk 16 required for recording operation was increased by about 1.3 times as compared with the case of the optical disk 15. Jitters at the track pitch of 0.7 μm in the optical disk 15 were 8.0% at the land and 8.2% at the groove and in turn the jitters at the track pitch of 0.7 μm in the optical disk 16 were 8.5% at the land and 8.7% at the groove.

In the case that the track pitch in the optical disk 16 where the film thickness of the heat sink control layer is thinner than the groove depth is 0.7 μm or less, increased jitter caused by the cross-erase was generated. However, in the case of the optical disk 15 having the film thickness of the heat sink control layer thicker than the groove depth, increased jitter caused by the cross-erase was generated at the track pitch narrower than 0.55 μm and under a condition in which the track pitch was 0.55 μm or more, increased jitter caused by the cross-erase was not found at all. Accordingly, it has become apparent that the effect of the present invention is realized at the track pitch ranging from 0.55 μm to 0.65 μm.

In addition, information was recorded at the adjacent track (the groove) after recording information at the land in the same manner as that of the experiment and measurement of the increased amount of jitter caused by the cross-erase of the reproduced signal at the land realized that the effect of reducing the cross-erase of the present invention was attained in the case of the optical disk 15 having a track pitch ranging from 0.55 μm to 0.7 μm.

Further, also in the following preferred embodiments, information was recorded and reproduced by the information recording and reproducing apparatus shown in FIG. 10.

In addition, in order to make clear a relation between the present invention and the groove depth, the present inventors performed the following experiments.

Figure 9:
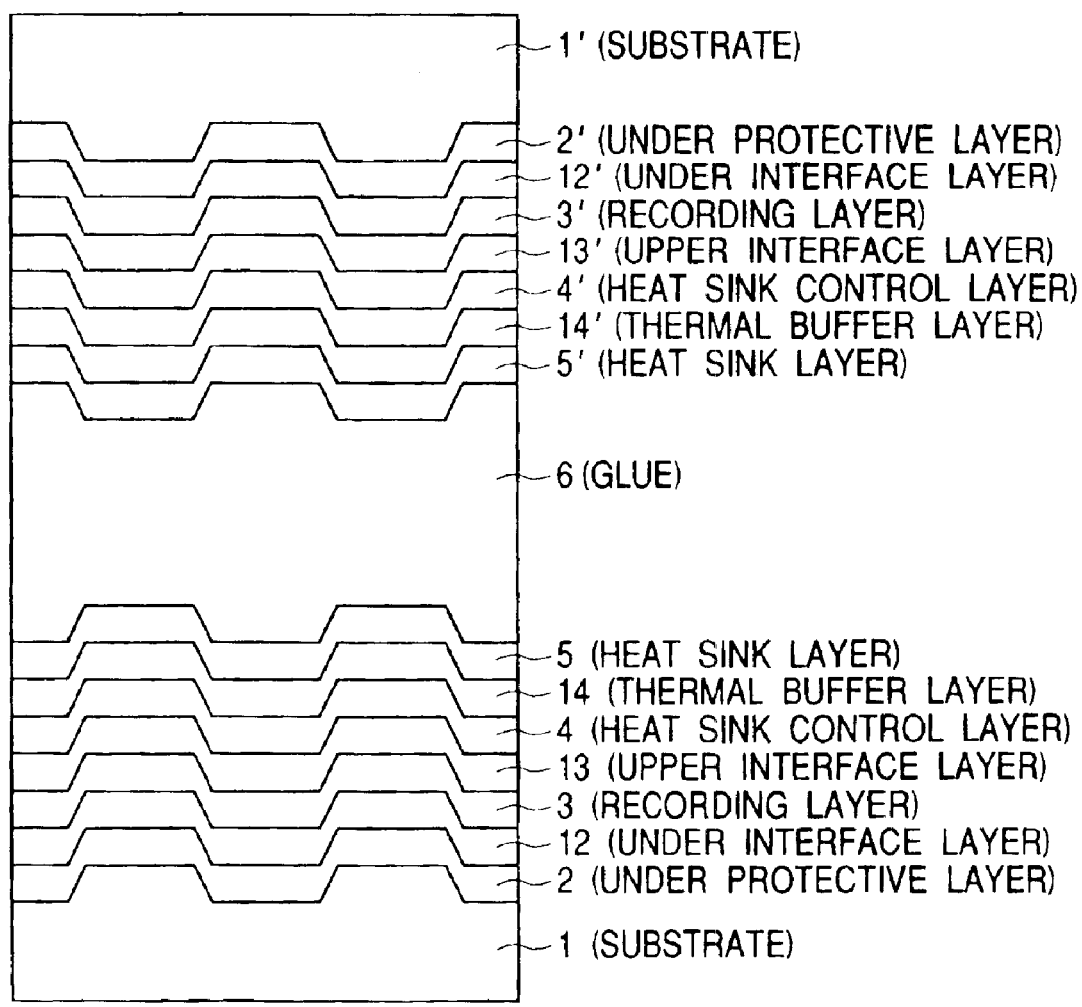
FIG. 9 is a sectional view for showing a structure of the information-recording medium in one preferred embodiment of the present invention.

Each of the thin films having structures shown in FIG. 9 was formed in sequence through sputtering process on the polycarbonate substrate 1 for use in recording several kinds of lands/grooves where a track pitch of 0.615 μm and address information for recording at both land and groove are arranged at the extremity end of each of the sectors, its thickness is 0.6 mm and a groove depth is changed in a range from 50 to 80 nm. Further, the information-recording members having a similar structure were adhered to each other through glue. A refractive index of the polycarbonate substrate was 1.58.

Information was recorded and reproduced at the optical disk under application of the information recording and reproducing apparatus shown in FIG. 10.

Information was recorded and reproduced under the same condition as that of the optical disk 15 in the preferred embodiment.

When the recording is carried out under the condition, the mark length of the 3T mark which is the shortest mark becomes about 0.42 μm and the mark length of the 14T mark which is the longest mark becomes about 1.96 μm.

Figure 12:
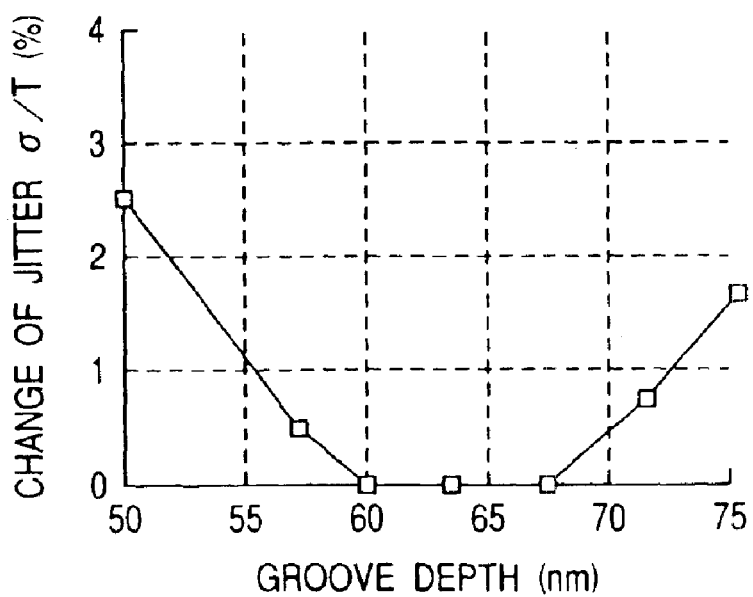
FIG. 12 is a view for showing a relation between a groove depth and an increased jitter caused by the cross-talk of the information-recording medium in one preferred embodiment of the present invention.

After recording information at the grooves of several kinds of optical disks having groove depths changed, information was recorded at the adjacent track (land), the groove depth dependency of the increased amount of jitter of the reproducing signal caused by the cross-talk was measured and indicated in FIG. 12.

In the case that the groove depth was in a range from 59 nm to 67 nm, increasing in jitter caused by the cross-talk was not occurred, but in the case that the groove depth was smaller than 59 nm or larger than 67 nm, increasing in jitter caused by the cross-erase and cross-talk was produced. As described above, in the case that the groove depth was in a range from 59 nm or more to 67 nm or less, it has become apparent that the effect of the present invention is realized. In addition, the effect for reducing the cross-talk is determined in reference to a relation between the laser wavelength of the laser beam and the groove depth and it is satisfactory if the groove depth is $\lambda/(7n)$ or more and $\lambda/(6.2n)$ or less, where the laser wavelength of the laser beam is defined as $\lambda$ and a refractive index of the substrate at the wavelength $\lambda$ is defined as (n).

In addition, overwriting operation of more than 100,000 times was carried out against each of the land and the groove of the optical disk with the groove depth being 59 nm or more and 67 nm or less to show that the increasing in jitter was 1% or less and it has been found that the characteristic of several times of rewriting operation was quite superior.

Further, the heat sink control layer where the effect of the present invention has a refractive index optically ranging from 1.4 to 3.0 and it is desirable that it is made of material not absorbing light, in particular, it contains metal oxide, carbide, nitride, sulfide and selenide and the like. In addition, it is also satisfactory that a plurality of heat sink control layers having different compositions are combined to each other. In the case that both Zn and S are contained in at least one kind of heat sink control layer in the heat sink control layers, the cross-erase reducing effect is remarkably realized in particular, although in particular in the case that the heat sink control layer is made of $(ZnS)_{80}(SiO_2)_{20}$ (mol ratio) or material with changed mixture ratio of ZnS and $SiO_2$ ($SiO_2$ being 5 to 50 mol %), material having composition near mixed composition of ZnS and the following oxide 5 to 40 mol %, its thermal conductivity is reduced, so that the heat sink control may easily be carried out. The mixed oxides are preferably $SiO_2$, $SiO$, $TiO_2$, $Al_2O_3$, $Y_2O_3$, $CeO$, $La_2O_3$, $In_2O_3$, $GeO$, $GeO_2$, $PbO$, $SnO$, $SnO_2$, $Bi_2O_3$, $TeO_2$, $WO_2$, $WO_3$, $Sc_2O_3$, $Ta_2O_5$, and $ZrO_2$. In addition, it is also applicable to use a heat sink control layer that some oxides such as Si—O—N material, Si—Al—O—N material, Cr—O material such as $Cr_2O_3$, Co—O material such as $Co_2O_3$, CoO; nitrides such as Si—N material such as TaN, AlN, $Si_3N_4$, Al—Si—N material (for example, $AlSiN_2$), Ge—N material; sulfide such as ZnS, $Sb_2S_3$, CdS, $In_2S_3$, $Ga_2S_3$, GeS, $SnS_2$, PbS, $Bi_2S_3$; selenides such as $SnSe_3$, $Sb_2S_3$, CdSe, ZnSe, $In_2Se_3$, $Ga_2S_3$, GeSe, $GeSe_2$, SnSe, PbSe, $Bi_2Se_3$; fluorides such as $CeF_3$, $MgF_2$, $CaF_2$ or the like. In addition, the layer of these mixed materials may be applied. Additionally, as found in the preferred embodiment, a multi-layer heat sink control layer may be applied in which the heat sink control layer composed of ZnS and oxide and the layer of the materials are overlapped to each other. In this case, anyone of oxides, nitrides, fluorides of the materials other than the ZnS and oxides is more preferable. In particular, in the case that a sum of film thickness of the heat sink control layer is more than a step or more between the information-recording tracks and 300 nm or less, it is possible to improve durability against a reduction in cross-talk, a high CNR and a deterioration in multi-rewriting, and further also in the case of recording information at both land and groove, the information-recording medium in which quality of reproduced signal attained from the land and the groove is not substantially different. More preferably, in the case that the film thickness of the heat sink control layer is 100 nm or more and 150 nm or less, its productivity as well as the effects is improved.

As the heat sink layer, either metal or alloy having a high reflection rate and a high thermal conductivity is preferable and it is desirable that a total amount of inclusion of Al, Cu, Ag, Au, Pt, Pd is 90% or more. In particular, in the case that the heat sink layer contained 95% or more of Al, it was possible to attain the information-recording medium low in cost and superior in durability against multi-rewriting operations and high in cross-erase reducing effect. In particular, in the case that composition of the heat sink layer contains Al by 95% or more, it is possible to realize the information-recording medium that is low in cost and is superior in corrosion resistance state. As added element for Al, it is preferable in view of corrosion resistance to provide Co, Ti, Cr, Ni, Mg, Si, V, Ca, Fe, Zn, Zr, Nb, Mo, Rh, Sn, Sb, Te, Ta, W, Ir, Pb, B and C, although in the case that the added element is Co, Cr, Ti, Ni, Fe, and Cu, these elements provide a substantial effect for improvement of corrosion resistance in particular. In addition, it is preferable that the film thickness of the heat sink layer is 30 nm or more and 300 nm or less. In the case that the film thickness of the heat sink layer is lower than 30 nm, heat generated at the recording layer is hardly dispersed, resulting in that when the disk is re-written by about 100,000 times in particular, there sometimes occurs that the recording film is easily deteriorated and the cross-erase may easily be generated. In addition, light is passed through it, it becomes hard to use it as a reflective layer and amplitude of the reproducing signal is reduced.

In the case that the film thickness of the heat sink layer is 300 nm or more, its productivity is poor, a warp is generated at the substrate by an inner stress of the heat sink layer and there sometimes occurs that the recording and reproducing of information cannot be carried out accurately. In addition, if the film thickness of the heat sink layer is 70 nm or more and 150 nm or less, the heat sink layer is superior in view of its corrosion resistance and productivity and this is further preferable.

Although in the preferred embodiment of the present invention, recording is carried out against the phase change recording layer having as its major constituents Ge, Sb, Te, In and Ag or the like in the optical disk, a basic concept of the present invention consists in attaining heat generated by the energy beam and controlling an optical characteristic of the optical disk (a reflection rate, an encoding degree) and thermal characteristics (a temperature distribution and a distribution of cooling speed) where the record mark is to be recorded with heat, so that the present invention is not restricted to the phase change optical disk, in particular, but its effects can be realized also in the recording of information against the optical magnetic recording layer having as its major constituents Tb, Fe, Co, Dy, and Gd or the like. In addition, the present invention is not restricted to the rewritable type information-recording medium. In addition, in the case of organic dye recording for performing a recording operation while the shape of the substrate or the recording layer is being changed, variation occurs only when the laser beam of high power is radiated. Although this variation is non-reversible, a basic concept of the present invention consists in attaining heat generated by the energy beam and controlling an optical characteristic of the optical disk (a reflection rate, an encoding degree) and thermal characteristics (a temperature distribution and a distribution of cooling speed) where the record mark is to be recorded with heat as described above, so that the present invention is not restricted to the rewritable type optical disk, in particular, but it can also be adapted for an additional writing type optical disk.

In addition, as the recording film used in the present invention, a phase change recording material is suitable in particular, and as material for the recording film in place of $Ag_6Ge_{16}Sb_{22}Te_{55}$ used in the preferred embodiment, materials having different composition ratio in Ag—Ge—Sb—Te such as $Ag_5Ge_{20}Sb_{20}Te_{55}$, $Ag_1Ge_{21}Sb_{23}Te_{55}$ hardly produce the reduction in the number of times of rewritable operation. As an amount of Ag is increased, the recording sensitivity is improved, although an amount of non-erased information is increased. In addition, as the amount of Ag is reduced, its erasing characteristic is improved, although the recording sensitivity is reduced. It has been found in Ag—Ge—Sb—Te materials that the composition with Ag of 1 to 5 atomic %, Ge of 17 to 23 atomic %, Sb of 19 to 25 atomic % and Te of 53 to 59 atomic % hardly produce the reduction in the number of times of rewritable operation, in particular. Further, it has been found preferable that the composition in which $AgSbTe_2$ or its nearby material occupies by 2 to 20% and $Ge_2Sb_2Te_5$ or its nearby material occupies balance is made such that a difference in reflection rate between its crystalline state and its amorphous state shows a higher value and a reproducing signal is increased.

Even in the case that Cr—Ge—Sb—Te type recording film such as $((Cr_4Te_5)_{10}(Ge_2Sb_2Te_6)_{90})$ or the like showed high jitter of 30,000 times or more in re-writing operations, a similar superior result could be attained in many other characteristics. It has been found in W—Ge—Sb—Te materials that the composition with W of 1 to 5 atomic %, Ge of 17 to 23 atomic %, Sb of 19 to 25 atomic % and Te of 53 to 59 atomic % hardly produce a less amount of erasing at the time of re-writing operation.

In general, such a recording film is a recording film in which a phase change composition with Ge—Sb—Te as its main component and a high melting point composition being added. More than 95% of a total number of atoms in the phase change composition is composed of a combination of GeTe and $Sb_2Te_3$ and high melting point composition of 95% or more of the total number of atoms is at least one of Cr—Te, Cr—Sb, Cr—Ge, Cr—Sb—Te, Cr—Sb—Ge, Cr—Ge—Te, Co—Te, Co—Sb, Co—Ge, Co—Sb—Te, Co—Sb—Ge, Co—Ge—Te, Cu—Te, Cu—Sb, Cu—Ge, Cu—Sb—Te, Cu—Sb—Ge, Cu—Ge—Te, Mn—Te, Mn—Sb, Mn—Ge, Mn—Sb—Te, Mn—Sb—Ge, Mn—Ge—Te, V—Te, V—Sb, V—Ge, V—Sb—Te, V—Sb—Ge, V—Ge—Te, Ni—Te, Ni—Sb, Ni—Ge, Ni—Sb—Te, Ni—Sb—Ge, Ni—Ge—Te, Mo—Te, Mo—Sb, Mo—Ge, Mo—Sb—Te, Mo—Sb—Ge, Mo—Ge—Te, W—Te, W—Sb, W—Ge, W—Sb—Te, W—Sb—Ge, W—Ge—Te, Ag—Te, Ag—Sb, Ag—Ge, Ag—Sb—Te, Ag—Sb—Ge, Ag—Ge—Te, or compositions near them, resulting in that the reduction in the number of times in rewritable operation is hardly reduced. It has been found that Cr—Te such as $Cr_4Te_5$, $Cr_2Te_3$ and $Cr_5Te_8$ and the like shows a special low jitter of 10 to 10,000 times of re-writing operation. It has been found that W—Te, W—Sb, W—Ge, W—Sb—Te, W—Sb—Ge, and W—Ge—Te show a special less amount of erasing at the time of re-writing operation. In addition, even if the light source wavelength is short, it has been found that $Ag_2Te$, $AgSbTe_2$ or the like have a high signal intensity and Ag—Te, Ag—Sb—Te have superior state, in particular.

In the case that a composition of 95% or more of the total number of atoms of the phase change composition is $Ge_2Sb_2Te_5$, a rate of high melting point composition atom in the total number of atoms in the recording film ranging from 5 atomic % or more and 20 atomic % or less shows a superior re-writing characteristic. The composition of 5 atomic % or more and 15 atomic % or less shows a superior erasing characteristic, so that it has a superior rewriting characteristic.

Further, even if at least one of $Ge_2Sb_2Te_5$, $GeSb_2Te_4$, $GeSb_4Te_7$, $In_3SbTe_2$, $In_{35}Sb_{32}Te_{33}$, $In_{31}Sb_{26}Te_{43}$, GeTe, Ag—In—Sb—Te, Co—Ge—Sb—Te, V—Ge—Sb—Te, Ni—Ge—Sb—Te, Pt—Ge—Sb—Te, Si—Ge—Sb—Te, Au—Ge—Sb—Te, Cu—Ge—Sb—Te, Mo—Ge—Sb—Te, Au—Ge—Sb—Te, Cu—Ge—Sb—Te, Mo—Ge—Sb—Te, Mn—Ge—Sb—Te, Fe—Ge—Sb—Te, Ti—Ge—Sb—Te, Bi—Ge—Sb—Te, W—Ge—Sb—Te and their nearby compositions other than the above is replaced or a part of Ge is replaced with In, its nearby characteristic can be attained.

Although the material containing nitrogen of 15 atomic % or less in each of the compositions of the recording films shows a slight reduction in the reproducing signal output, it has an advantage that the flowing of the recording film is restricted at the several times of re-writing operation.

Further, the impurity elements contained in the recording film, i.e. the element not described yet preferably enables 10 atomic % or less of the composition of the recording film to reduce a deterioration in the re-writing characteristic. The value of 5 atomic % or less was further preferable.

The film thickness of the recording film has a larger effect in reducing cross talk at least if it is less than a step (a groove depth) between the land and the groove. In addition, a value range from 5 nm or more to 20 nm or less preferably shows a high degree of encoding and its flow is hardly produced. If the value is 15 nm or less, it is further preferable.

The recording film in the present invention performs recording operation in reference to a variation in atomic arrangement. The variation in atomic arrangement in this case is meant by a variation in atomic arrangement where a change in outer shape of film such as a phase variation is scarcely accompanied.

As thermal buffer layer, it is preferable that the range of plurality of refractive indexes (n), (k) shows $1.4<n<4.5$, $-2.5<k<-0.5$, and in particular, it is preferable to provide material having a range of $2<n<3$, $-1.5<k<-0.5$. At thermal buffer layer, light is absorbed there, so that the material which is thermally stable is preferable and it is desirable that its melting point is required to be 1000° C. or more In addition, in the case that sulfide was added to the heat sink control layer, it had an effect for reducing a substantial high cross-erasing. However, in the case of thermal buffer layer, it is desirable that an amount of inclusion of sulfides such as ZnS or the like is lower than an amount of inclusion of the sulfide added at least to the heat sink control layer. This low setting is preferable to provide a countermeasure against occurrence of adverse effects such as a reduction in melting point, reduction in thermal conductivity and reduction in absorbing rate or the like.

As composition of the thermal buffer layer, it is desirable that the layer is of mixtures of metal and metal oxide, metal sulfide, metal nitride and metal carbide and the mixtures of Cr and $Cr_2O_3$ showed the most preferable improvement effect in overwriting characteristic. More practically, as the metal, mixtures of Al, Cu, Ag, Au, Pt, Pd, Co, Ti, Cr, Ni, Mg, Si, V, Ca, Fe, Zn, Zr, Nb, Mo, Rh, Sn, Sb, Te, Ta, W, Ir and Pb; and as metal oxide, metal sulfide, metal nitride and metal carbide, it is preferable to apply $SiO_2$, SiO, $TiO_2$, $Al_2O_3$, $Y_2O_3$, CeO, $La_2O_3$, $In_2O_3$, GeO, $GeO_2$, PbO, SnO, $SnO_2$, $Bi_2O_3$, $TeO_2$, $WO_2$, $WO_3$, $SC_2O_3$, $Ta_2O_5$ and $ZrO_2$. In addition, it is also applicable to use thermal buffer layer composed of oxide such as Si—O—N materials, Si—Al—O—N materials, Cr—O materials such as $Cr_2O_3$ and Co—O materials such as $Co_2O_3$, CoO and the like; nitrides such as Si—N materials as TaN, AlN, $Si_3N_4$, Al—Si—N materials (for example, $AlSiN_2$) and Ge—N materials; sulfides such as ZnS, $Sb_2S_3$, CdS, $In_2S_3$, $Ga_2S_3$, GeS, $SnS_2$, PbS, $Bi_2S_3$ or the like; selenides such as $SnSe_3$, $Sb_2S_3$, CdSe, ZnSe, $In_2Se_3$, $Ga_2Se_3$, GeSe, $GeSe_2$, SnSe, PbSe, $Bi_2Se_3$; fluorides such as $CeF_3$, $MgF_2$, $CaF_2$ or the like; or the nearby composition to the materials.

In addition, as the film thickness of thermal buffer layer, it is desirable to set a value of 10 nm or more and 100 nm or less, and in the case that the thickness is 20 nm or more and 50 nm or less, a specific superior effect of improving the overwriting characteristic appears.

As described above, thermal buffer layer has a feature for absorbing light. Due to this fact, thermal buffer layer may also absorb light and generate heat in the same manner as that the recording layer may absorb light and generate heat. In addition, it is important that the absorbing rate at thermal buffer layer, if the recording layer is of amorphous state, is larger than the case in which the recording layer is of crystalline state. Optical design for the material in this way causes an effect for reducing the absorbing rate Aa at the recording layer under a state in which the recording layer is in an amorphous state to be reduced than the absorbing rate Ac at the recording layer in which the recording layer is in a crystalline state to be appeared. Through this effect, the overwriting characteristic can be substantially improved. In order to attain the characteristic, it is necessary to increase the absorbing rate at thermal buffer layer up to about 30 to 40%. The heating calorie at thermal buffer layer is made different in response to whether or not the state of the recording layer is in a crystalline state or an amorphous state. As a result, a flow of heat from the recording layer to the heat sink layer is changed in response to the state of the recording layer, resulting in that this phenomenon enables an increasing in jitter caused by the overwriting operation to be restricted.

The effect may appear due to an effect for shutting off a flow of heat from the recording layer to the heat sink layer caused by an increased temperature at thermal buffer layer. In order to attain an effective utilization of this effect, a film thickness relation between the heat sink control layer and thermal buffer layer becomes important. As a result of sincere study, the present inventors clarified the fact that a narrow track pitch formation can be realized without reducing CNR and a recording sensitivity when a sum of film thickness of the heat sink control layer ismore than a film thickness of thermal buffer layer and in particular, a superior overwriting can be realized even under a high density recording operation in which the recording mark length is less than a half size of the energy beam spot diameter. In particular, in the case that the length of the shortest recording mark was 40% or more and 50% or less of the energy beam spot diameter, the effect of the present invention appeared most remarkably.

In addition, when the phase change recording material is utilized in particular as the recording layer as described above, there sometimes occurs a phenomenon that several times of rewriting operation such as 100,000 times of rewriting operation causes the reflection rate of crystal to be reduced. This is a phenomenon generated when the laser beam of high power level melts the recording layer, S element in the heat sink control layer is melted into the recording layer and a refraction rate of the recording layer is changed. In order to restrict this phenomenon, it is preferable to arrange the interface layer having a smaller amount of inclusion of S element than at least that of the heat sink control layer between the heat sink control layer and the recording layer. With such an arrangement as above, it becomes possible to improve a long period holding life time.

As materials for the interface layer, it is preferable to apply $SiO_2$, $SiO$, $TiO_2$, $Al_2O_3$, $Y_2O_2$, $CeO$, $La_2O_3$, $In_2O_3$, $GeO$, $GeO_2$, $PbO$, $SnO$, $SnO_2$, $Bi_2O_3$, $TeO_2$, $WO_2$, $WO_3$, $Sc_2O_3$, $Ta_2O_5$ and $ZrO_2$. In addition, it is also applicable to use an interface layer including oxides such as Si—O—N materials, Si—Al—O—N materials, Cr—O material such as $Cr_2O_3$, Co—O materials such as $Co_2O_3$, CoO; nitrides such as Si—N materials such as TaN, AlN, $Si_3N_4$, Al—Si—N materials (for example, $AlSiN_2$), Ge—N materials; fluorides such as $CeF_3$, $MgF_2$, $CaF_2$ or the like or the composition near the materials. Further, layers of these mixed materials may be applied. The present invention is superior in view of the fact that if the interface layer is made of mixed materials of ZnS, the oxides, nitrides and fluorides, its recording sensitivity is improved.

Then, in order to attain the most-suitable film thickness of each of the heat sink control layer and the heat sink layer as well as a thermal conductivity, a thermal simulation as indicated below has been carried out.

Figure 13:
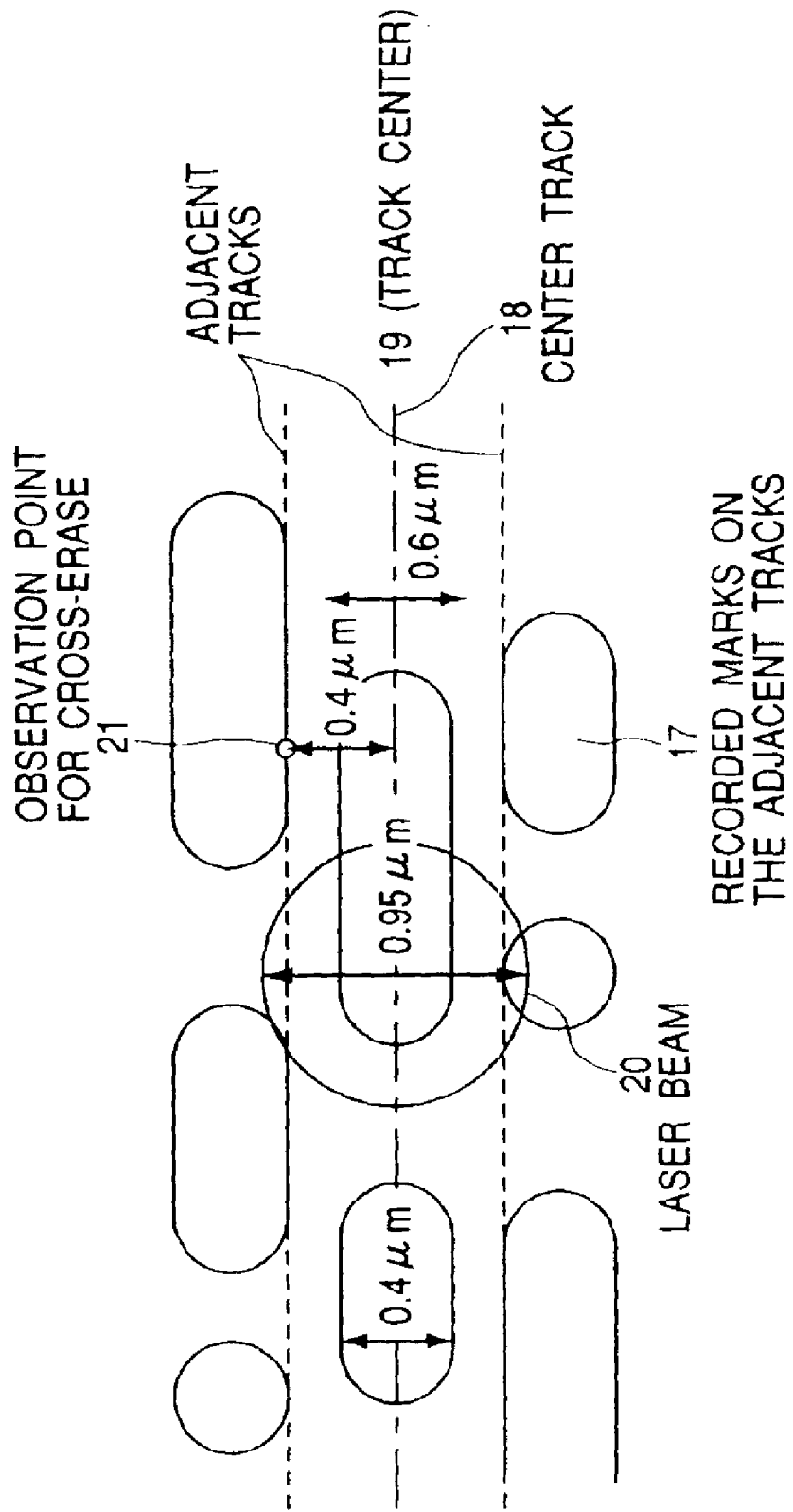
FIG. 13 is a view for showing a layout of a record mark and information record tracks in the information-recording medium in one preferred embodiment of the present invention.

A layout of a mark and a groove at a land-and-groove recording system type high-density information-recording medium such as 4.7 GB DVD-RAM, for example, is substantially set like shown in FIG. 13. That is, a width of each of the land and the groove is about 0.6 μm, respectively, and a mark width (a width of melting section) is about 0.4 μm. Further, a melting point of the recording mark is about 600° C. Accordingly, in order to realize the mark width of 0.4 μm, it is necessary to heat a location spaced apart by 0.2 μm from the center of the track to 600° C. Further, with such a layout as above, the recording mark 17 at the adjacent track is present at a position spaced apart by 0.4 μm from the track center 19 of the central track 18. A phenomenon in which the recording mark 17 of the adjacent track is crystallized is called as a cross-erase. A condition in which no cross-erase is produced even after recording operation of 100,000 times is determined by a function of temperature and time at the recording mark 17 of the adjacent track when the laser beam 20 is radiated against the central track 18.

A crystallization time of Ge—Sb—Te type phase change recording material used in the high density information recording medium such as 4.7 GB DVD-RAM becomes a function of temperature due to the fact that an exciting energy is present between the amorphous state and the crystalline state. A time in which the laser beam spot passes through a certain point on the medium is about 100 ns under the condition of 4.7 GB DVD-RAM (8.2 m/s). It is estimated that a crystal formation temperature during such a time as above is approximately 300 to 500° C. In addition, in the case that the laser beam was radiated against the adjacent track by 100,000 times, an accumulated value of time when the adjacent track is radiated with the laser beam is about 10 seconds. Accordingly, the crystal formation temperature when the medium is held for about 10 seconds corresponds to a temperature in which the cross-erase is generated. Accordingly, a time of holding medium at 200° C. or more (a cross-erase temperature holding time) is calculated in reference to a variation in temperature at the end part of the mark (a cross-erase observing point 21) of the recording mark 17 at the adjacent track when the width of a part heated to 600° C. or more is set to 0.4 μm under application of a heat simulation, thereby it is possible to discriminate whether or not the cross-erase is generated.

Figure 14:
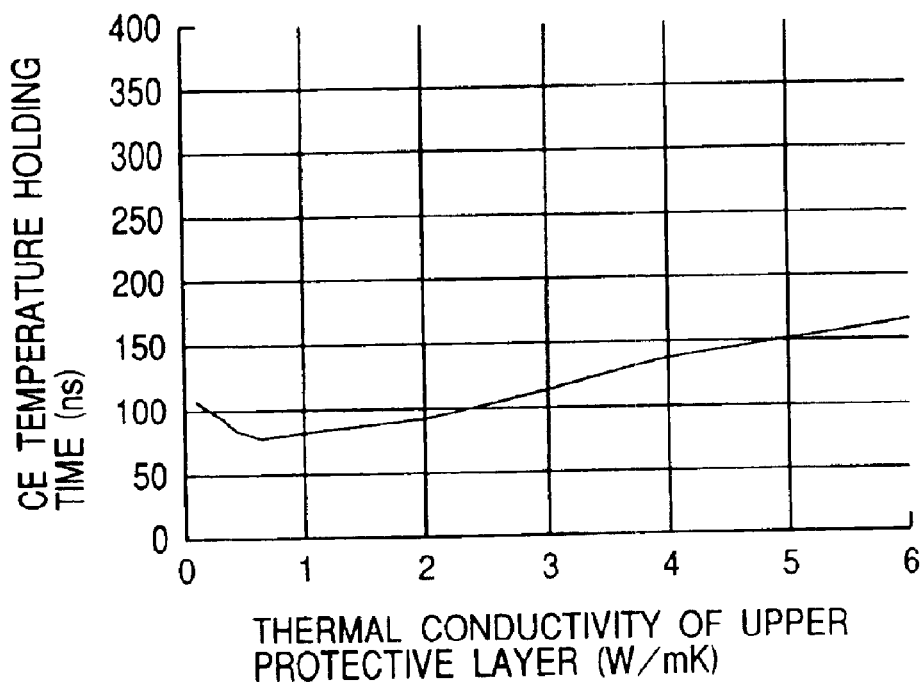
FIG. 14 is a view for showing a relation between a thermal conductivity at the heat sink control layer and a cross-erase temperature holding time in the information-recording medium of one preferred embodiment of the present invention.

At first, in the structure shown in FIG. 1 (the under protective layer 2: $(ZnS)_{80}(SiO_2)_{20}$ (100 nm), the recording layer 3: $Ag_6Ge_{16}Sb_{22}Te_{55}$ phase change recording layer (10 nm), the heat sink control layer 4: $(ZnS)_{80}(SiO_2)_{20}$ (140 nm), the heat sink layer 5: Al (80 nm)), a relation between thermal conductivity at the heat sink control layer and the cross-erase temperature holding time at the cross-erase observing point 21 when thermal conductivity in the heat sink control layer is changed is calculated and indicated in FIG. 14. It has been found that there is present a thermal conductivity where the cross-erase temperature holding time becomes the shortest one and this value is about 0.6 W/mK. In addition, in order to satisfy the cross-erase holding time of the target value of 100 ns or less, it has been found that thermal conductivity is in a range from 0.1 to 2.3 W/mK. This thermal conductivity is accomplished by a dielectric film containing S element such as $(ZnS)_{80}(SiO_2)_{20}$ and this corresponds to the case in which an amount of inclusion of S element is 5% or more and 50% or less.

Figure 15:
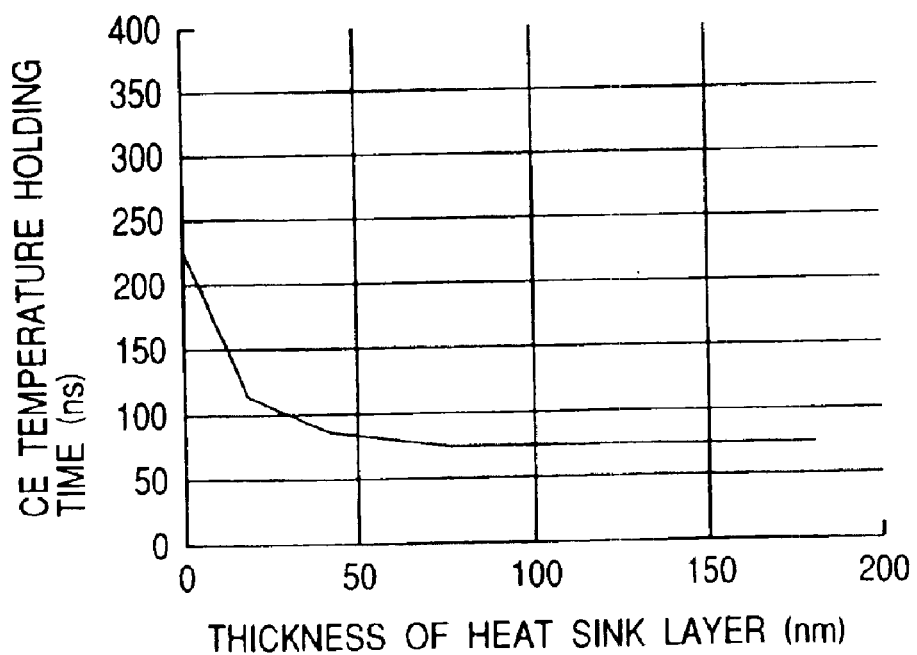
FIG. 15 is a view for showing a relation between a film thickness at the heat sink control layer and a cross-erase temperature holding time in the information-recording medium of one preferred embodiment of the present invention.

Then, a relation between the film thickness of the heat sink layer and the cross-erase temperature holding time at the adjacent track observation point is calculated and its result of calculation is indicated in FIG. 15. The cross-erase temperature holding time in an area where the heat sink layer (Al) is thin to have 30 nm or less becomes 100 ns or more, and to the contrary, under a condition in which the film thickness of the heat sink layer is 30 ns or more, it is kept at the cross-erase temperature holding time of 100 ns or less.

Figure 16:
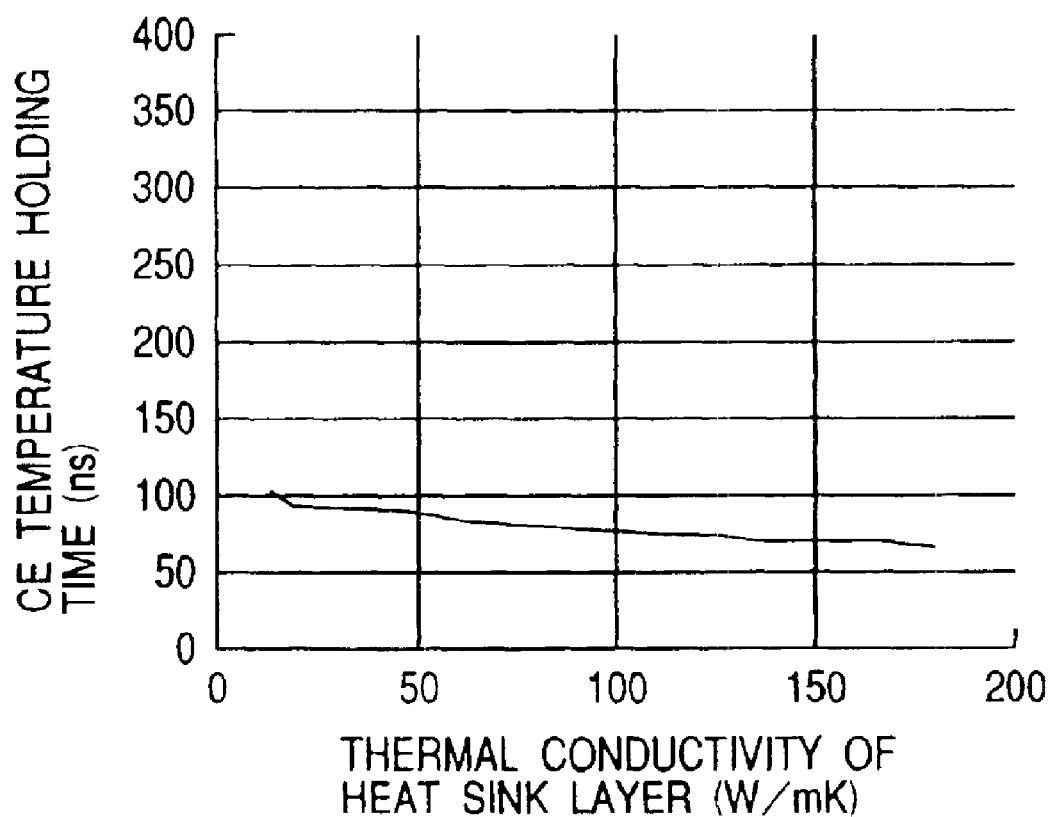
FIG. 16 is a view for showing a relation between a thermal conductivity at the heat sink control layer and a cross-erase temperature holding time in the information-recording medium of one preferred embodiment of the present invention.

Then, as to the case in which the film thickness of the heat sink layer is 80 nm, a relation between thermal conductivity of the heat sink layer and the cross-erase temperature holding time at the cross-erase observation point is calculated and the result of calculation is indicated in FIG. 16. As shown in this figure, it has been found that as thermal conductivity of the heat sink layer is increased, the cross-erase temperature holding time becomes short. In particular, in order to keep the cross-erase temperature holding time less than 100 ns of target value, it has been found that it is satisfactory to keep thermal conductivity of the heat sink layer more than 10 W/mK. Material having a high thermal conductivity is either metal of high reflection rate such as Au, Al, Cu, Ag, Pd, and Pt or the like or a high hardness material such as a diamond or the like. In particular, in the case that an amount of inclusion of the metal of high reflection rate described above is 90% or more, it can be employed as the heat sink layer having a high reflection rate and a high thermal conductivity. In particular, in consideration of its productivity, cost, anti-corrosion and refraction rate or the like, it is the best way to apply Al or metal in which metals such as Ti, Cr or the like are added to Al. In particular, the heat sink layer containing Al of 97% or more shows a superior practicability.

As already described in detail, the information-recording medium of the present invention enables such an information-recording medium as one to be realized in which CNR, the overwriting characteristic and the recording sensitivity are not reduced even in the case of high density recording where the track pitch becomes 70% or less of the laser beam spot diameter and further no cross-erase is produced.

Further, the information-recording medium of the present invention enables a narrow track pitch to be realized without reducing CNR, overwriting characteristic and recording sensitivity even in the case that the high density recording is carried out to cause the track pitch to become 70% or less of the laser beam spot diameter and further enables the information recording medium having high recording density corresponding to the information recording and reproducing device using a low-cost semiconductor laser to be realized.

Further, the information-recording medium of the present invention enables a narrow track pitch to be realized without reducing CNR and recording sensitivity even in the case that the high density recording is carried out to cause the track pitch to become 70% or less of the laser beam spot diameter and further in particular enables the information-recording medium indicating a superior overwriting characteristic even under a high density recording is carried out to cause the recording mark length to become a half of the energy beam spot.

Further, the information-recording medium of the present invention enables a narrow track pitch to be realized without reducing CNR, overwriting characteristic and recording sensitivity even in the case that the high density recording is carried out to cause the track pitch to become 70% or less of the laser beam spot diameter and further enables the information-recording medium showing no deterioration of reproducing signal even after several times of rewriting operation of about 100,000 times to be realized.

Further, the information-recording medium of the present invention enables a narrow track pitch to be realized without reducing CNR, overwriting characteristic and recording sensitivity even in the case that the high density recording is carried out to cause the track pitch to become 70% or less of the laser beam spot diameter and further enables the information-recording medium producing no difference in recording sensitivities between one case for recording information at a land and the other case for recording information at a groove to be realized.

INDUSTRIAL APPLICABILITY OF THE INVENTION

As described above, the present invention is useful as the information-recording medium used for a high density recording operation in such a way that the track pitch may become 70% or less of the laser beam spot diameter.

We claim:

1. An information recording comprising:
   an information recorded under an atomic arrangement is changed and/or an electronic state is changed by radiation of an energy beam;
   a recording layer;
   a thermal buffer layer comprising a mixture of Cr and $Cr_2O_3$; and
   a heat sink layer arranged on a contrary side of a radiation side of said energy beam.

2. An information recording medium according to claim 1, wherein said heat sink layer comprises Al of 97% or more.

3. An information recording medium according to claim 1, wherein said heat sink layer comprises Al containing Tl or Cr.

4. An information recording medium according to claim 1, wherein said recording layer includes:
   a plurality of information recording tracks;
   a step between said information recording tracks; and
   the distance between said recording layer and said heat sink layer is equal to or more than a depth (or a width) of said step between said information recording tracks.

5. An information recording medium according to claim 4, wherein:
   a thickness of said recording layer is equal to or less than said depth (or said width) of said step between said information recording tracks.

* * * * *